United States Patent [19]
Weder

[11] Patent Number: 5,727,362
[45] Date of Patent: Mar. 17, 1998

[54] OPTICAL EFFECT MATERIAL AND METHODS

[75] Inventor: Donald E. Weder, Highland, Ill.

[73] Assignee: Southpac Trust International, Inc.

[21] Appl. No.: 717,467

[22] Filed: Sep. 20, 1996

Related U.S. Application Data

[63] Continuation-in-part of Ser. No. 454,474, May 30, 1995, which is a continuation of Ser. No. 179,057, Jan. 7, 1994, Pat. No. 5,576,089, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 179,057, is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, said Ser. No. 179,057, is a continuation-in-part of Ser. No. 24,573, Mar. 1, 1993, abandoned, which is a continuation of Ser. No. 464,694, Jan. 16, 1990, Pat. No. 5,208,027, which is a continuation of Ser. No. 219,083, said Ser. No. 179,057, is a continuation-in-part of Ser. No. 95,331, Jul. 21, 1993, Pat. No. 5,428,939, which is a continuation-in-part of Ser. No. 963,882, Oct. 20, 1992, Pat. No. 5,408,803, which is a continuation-in-part of Ser. No. 865,563, and Ser. No. 893,586, said Ser. No. 95,331, is a continuation-in-part of Ser. No. 923,117, Jul. 30, 1992, Pat. No. 5,307,605, which is a continuation-in-part of Ser. No. 803,318, Dec. 4, 1991, Pat. No. 5,344,016, which is a continuation-in-part of Ser. No. 707,417, said Ser. No. 95,331, is a continuation-in-part of Ser. No. 940,930, Sep. 4, 1992, Pat. No. 5,361,482, which is a continuation-in-part of Ser. No. 926,098, Aug. 5, 1992, which is a continuation-in-part of Ser. No. 803,318, said Ser. No. 940,930, is a continuation-in-part of Ser. No. 687,701, Apr. 18, 1991, abandoned, which is a continuation-in-part of Ser. No. 649,263, Jan. 30, 1991, abandoned, which is a continuation of Ser. No. 248,960, Sep. 26, 1988, abandoned, which is a continuation-in-part of Ser. No. 219,083, said Ser. No. 926,098, is a continuation-in-part of Ser. No. 687,701.

[51] Int. Cl.$^6$ .............................. B65B 11/02; B65B 25/02
[52] U.S. Cl. ........................ 53/397; 53/399; 53/410; 53/411; 53/461
[58] Field of Search ............... 53/397, 399, 410, 53/411, 461, 465; 47/72; 229/3.5 R, 87.01, 87.06

[56] References Cited

U.S. PATENT DOCUMENTS

| | | |
|---|---|---|
| 31,780 | 12/1861 | Cooper et al. |
| 2,240,072 | 4/1941 | Hodgdon et al. |
| 2,774,187 | 12/1956 | Smithers. |
| 2,989,828 | 6/1961 | Warp. |
| 3,094,810 | 6/1963 | Kalpin. |
| 3,150,031 | 9/1964 | Powell. |
| 3,231,645 | 1/1966 | Bolomey. |

(List continued on next page.)

FOREIGN PATENT DOCUMENTS

| | | |
|---|---|---|
| 1166692 | 3/1964 | Germany. |
| 1204647 | 9/1970 | United Kingdom. |

OTHER PUBLICATIONS

Brochure, "The Simple Solution For Those Peak Volume Periods" Highland Supply Corp. ©1989.
Speed Sheets & Speed Rolls Brochure, Highland Supply Corporation, ©1990. 2 Pgs.
LePlant SAC Advertisement, published prior to Sep. 26, 1987.

*Primary Examiner*—Horace M. Culver
*Attorney, Agent, or Firm*—Dunlap & Codding, P.C.

[57] ABSTRACT

A method for forming a decorative cover about a floral grouping from an optical effect material having a holographic design which constitutes at least a portion of the decor of the decorative cover. The optical effect material may include printed matter and/or embossed pattern to provide at least a portion of the decor of the decorative cover.

38 Claims, 11 Drawing Sheets

U.S. PATENT DOCUMENTS

| | | |
|---|---|---|
| 3,271,922 | 9/1966 | Wallerstein et al. . |
| 3,376,666 | 4/1968 | Leonard . |
| 3,400,036 | 9/1968 | Hemrick et al. . |
| 3,431,706 | 3/1969 | Stuck . |
| 3,475,191 | 10/1969 | Lodge et al. . |
| 3,481,663 | 12/1969 | Greenstein . |
| 3,508,372 | 4/1970 | Wallerstein et al. . |
| 3,549,405 | 12/1970 | Schrenk et al. . |
| 3,554,434 | 1/1971 | Anderson . |
| 3,616,192 | 10/1971 | Sinclair . |
| 3,749,629 | 7/1973 | Andrews et al. . |
| 3,865,664 | 2/1975 | Neumann . |
| 3,922,440 | 11/1975 | Wegwerth et al. . |
| 3,962,503 | 6/1976 | Crawford . |
| 4,162,343 | 7/1979 | Wilcox et al. . |
| 4,189,868 | 2/1980 | Tymchuck et al. . |
| 4,333,267 | 6/1982 | Witte . |
| 4,400,910 | 8/1983 | Koudstaal et al. . |
| 4,413,725 | 11/1983 | Burno et al. . |
| 4,520,064 | 5/1985 | Contemporary Inc. . |
| 4,530,863 | 7/1985 | Seeger . |
| 4,699,820 | 10/1987 | Herr, Jr. et al. . |
| 4,786,533 | 11/1988 | Crass et al. . |
| 4,801,014 | 1/1989 | Meadows . |
| 4,963,218 | 10/1990 | Rainey . |
| 5,008,143 | 4/1991 | Armanini . |
| 5,089,318 | 2/1992 | Shetty et al. . |
| 5,111,638 | 5/1992 | Weder . |
| 5,147,706 | 9/1992 | Kingman . |
| 5,154,765 | 10/1992 | Armanini . |
| 5,204,160 | 4/1993 | Rouser . |
| 5,228,234 | 7/1993 | deKlerk et al. . |
| 5,235,782 | 8/1993 | Landau . |
| 5,245,814 | 9/1993 | Weder . |
| 5,307,605 | 5/1994 | Straeter . |
| 5,335,476 | 8/1994 | Weder . |
| 5,335,477 | 8/1994 | Weder . |
| 5,347,789 | 9/1994 | Weder . |
| 5,369,934 | 12/1994 | Weder . |
| 5,381,642 | 1/1995 | Weder et al. . |
| 5,388,386 | 2/1995 | Weder . |
| 5,408,803 | 4/1995 | Weder et al. . |
| 5,428,939 | 7/1995 | Weder et al. . |
| 5,448,875 | 9/1995 | Weder . |
| 5,456,056 | 10/1995 | Weder . |
| 5,465,551 | 11/1995 | Weder . |
| 5,467,573 | 11/1995 | Weder et al. . |
| 5,509,251 | 4/1996 | Weder et al. . |
| 5,526,932 | 6/1996 | Weder et al. . |
| 5,533,319 | 7/1996 | Weder . |
| 5,533,320 | 7/1996 | Weder . |
| 5,537,799 | 7/1996 | Straeter . |
| 5,537,800 | 7/1996 | Weder . |
| 5,634,318 | 6/1997 | Weder ................................ 53/411 X |
| 5,661,951 | 9/1997 | Weder ................................ 53/411 X |

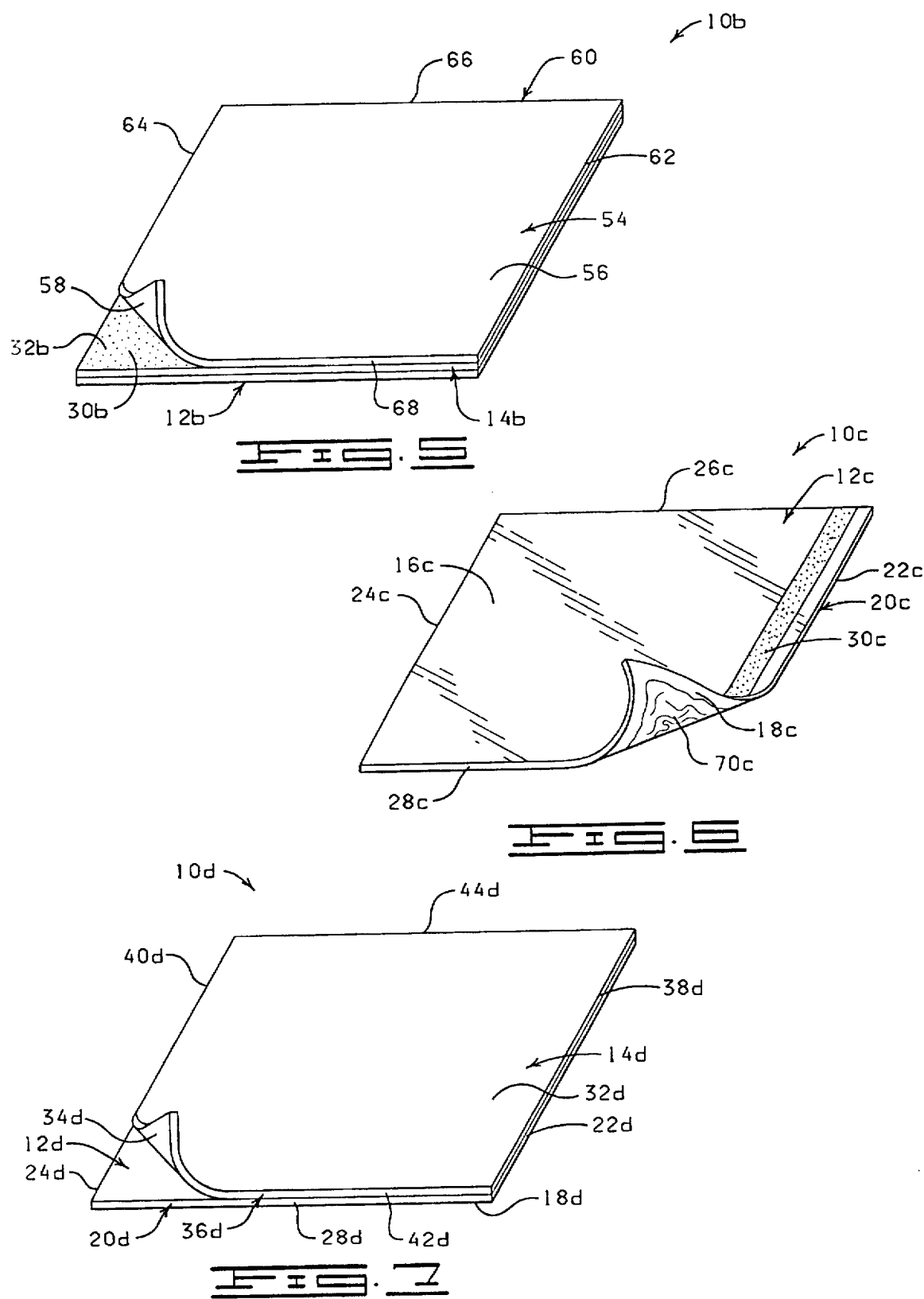

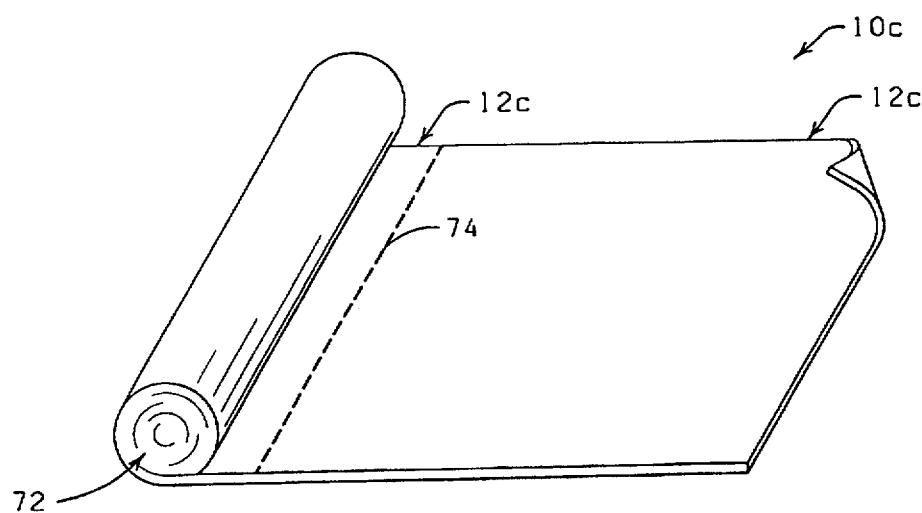
FIG. 8
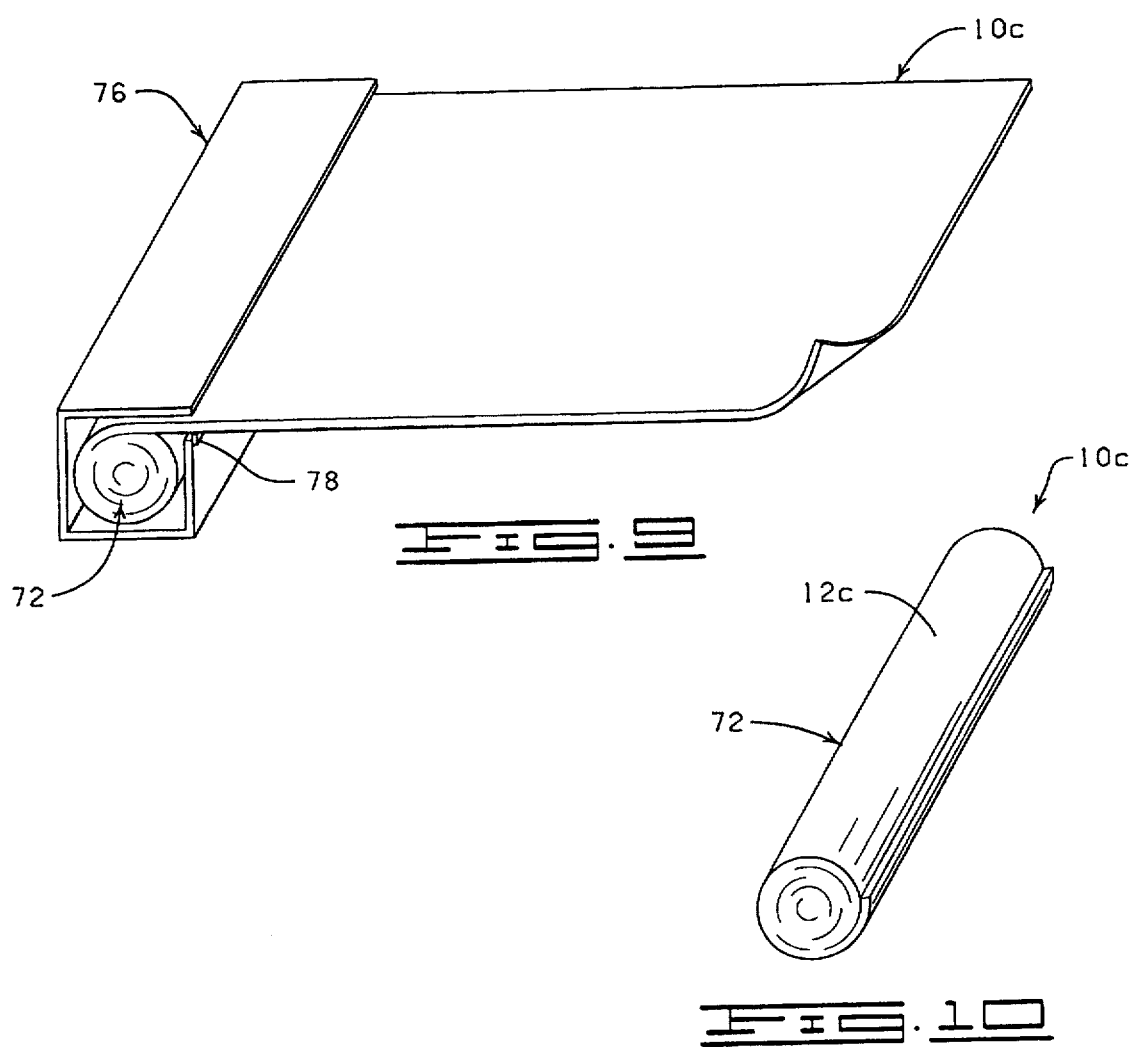
FIG. 9
FIG. 10

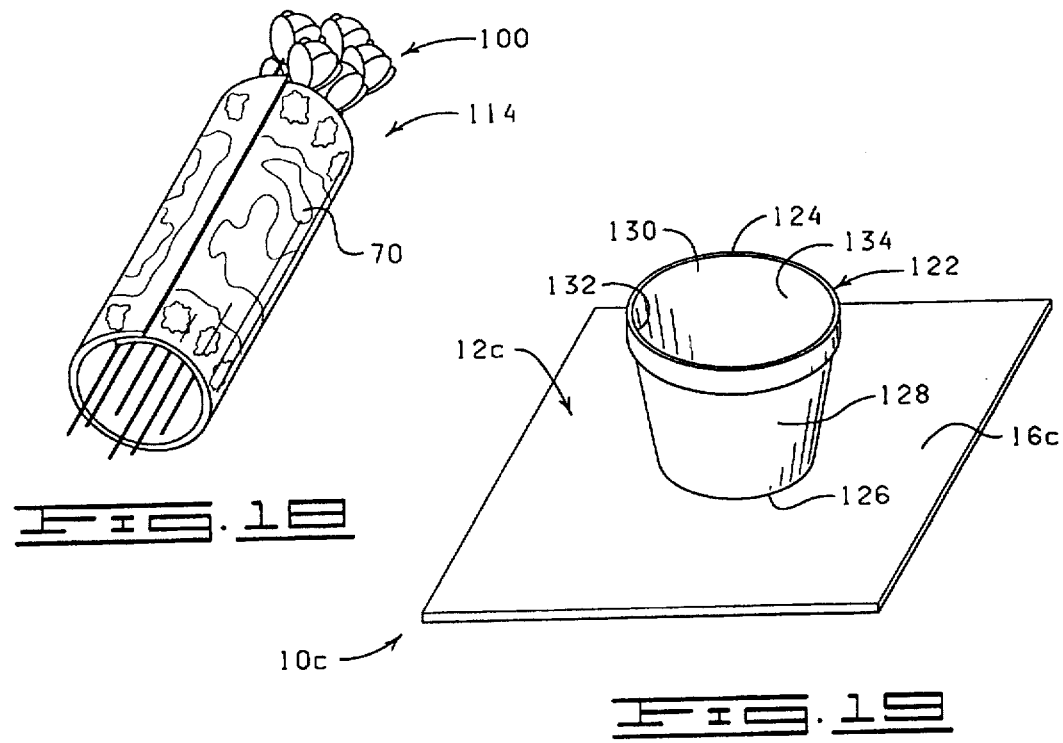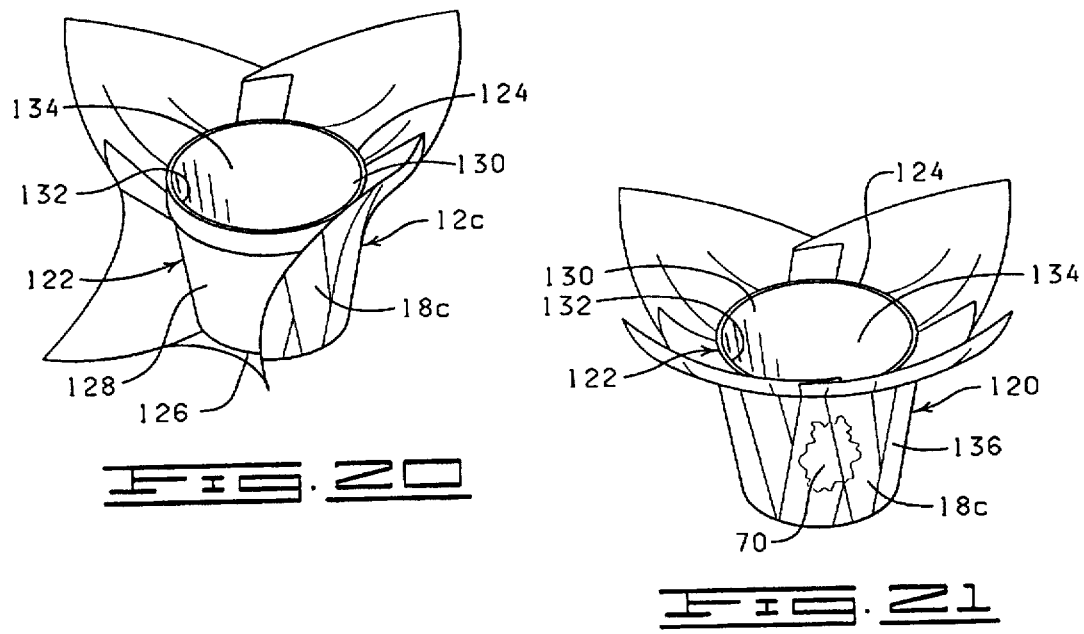

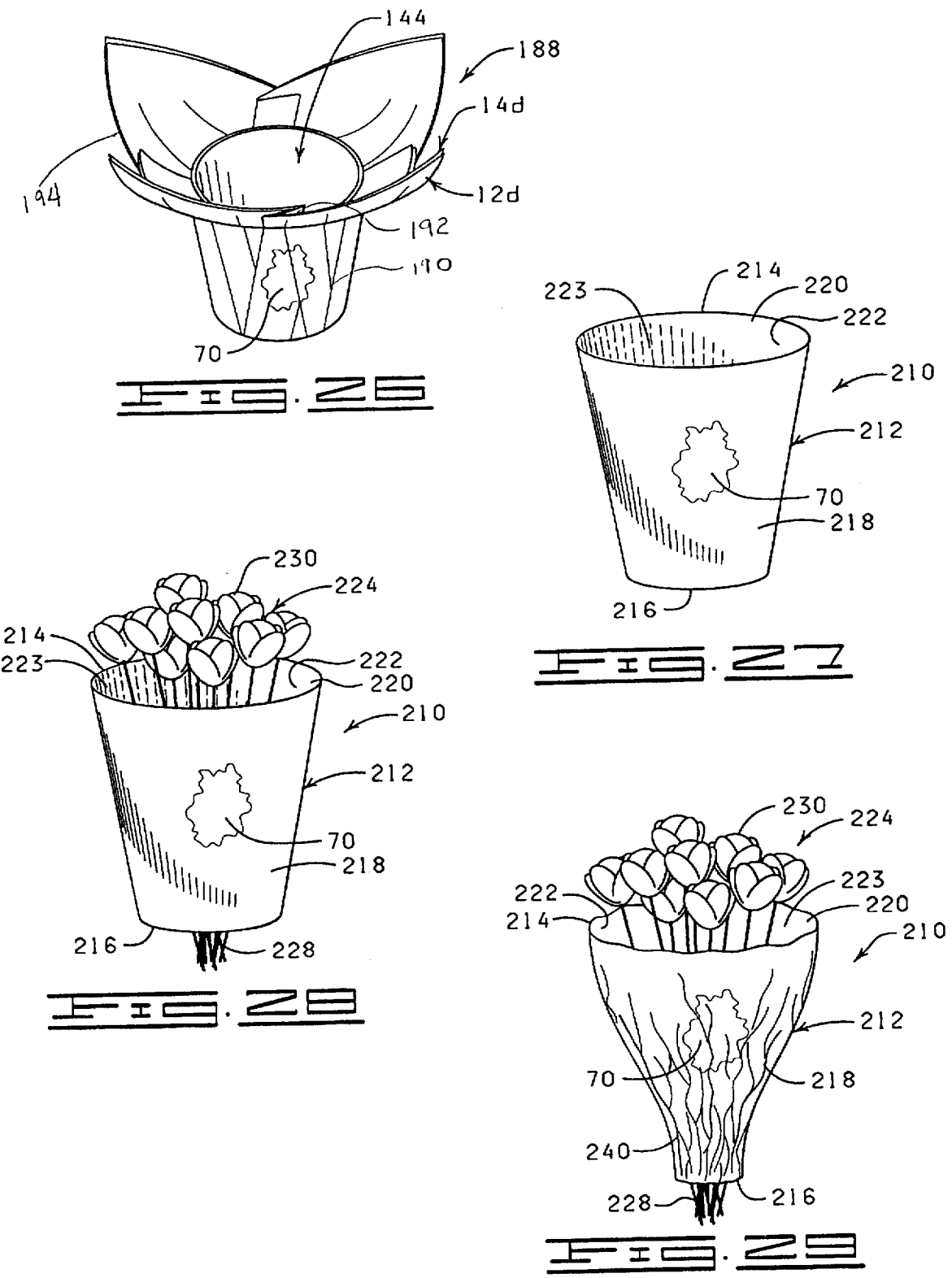

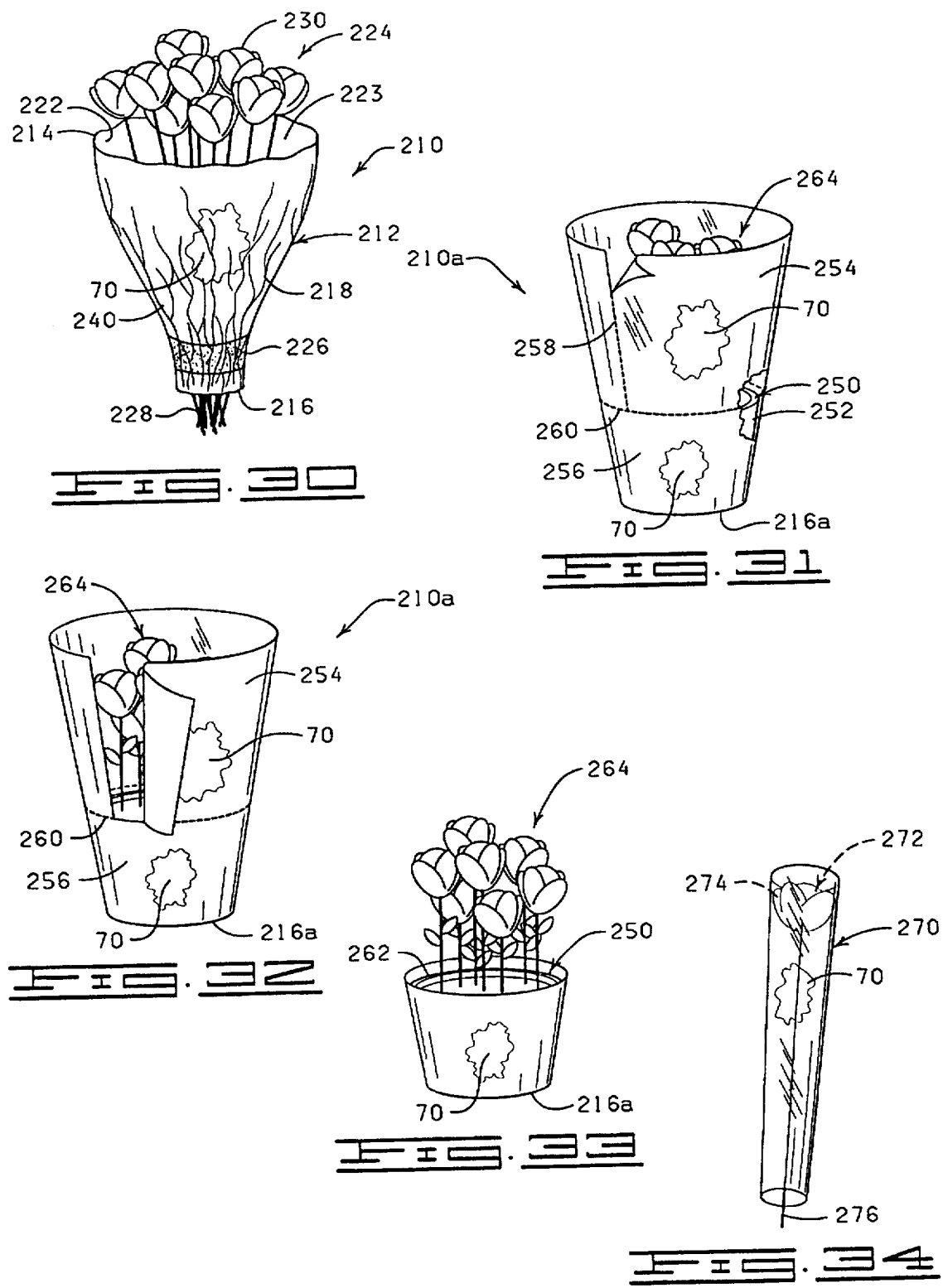

OPTICAL EFFECT MATERIAL AND METHODS

CROSS REFERENCE TO RELATED APPLICATIONS

This application is a continuation-in-part of application U.S. Ser. 08/454,474, filed May 30, 1995, entitled "OPTICAL EFFECT MATERIAL AND METHODS"; which is a continuation of U.S. Ser. No. 08/179,057, filed Jan. 7, 1994, entitled "OPTICAL EFFECT MATERIAL AND METHODS", now U.S. Pat. No. 5,576,089; which is a continuation-in-part of U.S. Ser. No. 07/968,798, filed Oct. 30, 1992, entitled "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", now U.S. Pat. No. 5,369,934; which is a continuation of U.S. Ser. No. 07/865,563, filed Apr. 9, 1992, entitled "METHODS FOR WRAPPING A FLORAL GROUPING", now U.S. Pat. No. 5,245,814; which is a continuation of U.S. Ser. No. 07/649,379, filed Jan. 31, 1991, entitled "METHOD FOR WRAPPING AN OBJECT WITH A MATERIAL HAVING PRESSURE SENSITIVE ADHESIVE THEREON", now U.S. Pat. No. 5,111,638; which is a continuation of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON", now abandoned; which is a continuation-in-part of U.S. Ser. No. 219,083, filed Jul. 13, 1988, entitled "ARTICLE FORMING SYSTEM", now U.S. Pat. No. 4,897,031; which is a continuation of Ser. No. 004,275, filed Jan. 5, 1987, entitled "ARTICLE FORMING SYSTEM", now U.S. Pat. No. 4,773,182; which is a continuation of Ser. No. 613,080, filed May 22, 1984, entitled "ARTICLE FORMING SYSTEM", now abandoned.

Said application Ser. No. 08/179,057, now U.S. Pat. No. 5,576,089, is also a continuation-in-part of application U.S. Ser. No. 07/965,585, filed on Oct. 23, 1992, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/893,586, filed Jun. 2, 1992, entitled "WRAPPING A FLORAL GROUPING WITH SHEETS HAVING ADHESIVE OR COHESIVE MATERIAL APPLIED THERETO", now U.S. Pat. No. 5,181,364; which is a continuation of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned; which is a continuation-in-part of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON", now abandoned; which is a continuation-in-part of U.S. Ser. No. 07/219,083, filed Jul. 13, 1988, entitled "ARTICLE FORMING SYSTEM", now U.S. Pat. No. 4,897,031; which is a continuation of Ser. No. 07/004,275, filed Jan. 5, 1987, entitled "ARTICLE FORMING SYSTEM", now U.S. Pat. No. 4,773,182; which is a continuation of Ser. No. 613,080, filed May 22, 1984, entitled "ARTICLE FORMING SYSTEM", now abandoned.

Said application Ser. No. 08/179,057, now U.S. Pat. No. 5,576,089, is also a continuation-in-part of application U.S. Ser. No. 08/024,573, filed Mar. 1, 1993, titled "ARTICLE FORMING SYSTEM", now abandoned; which is a continuation of Ser. No. 07/464,694, filed Jan. 16, 1990, entitled "ARTICLE FORMING SYSTEM", now U.S. Pat. No. 5,208,027; which is a continuation of U.S. Ser. No. 07/219, 083, filed Jul. 13, 1988, entitled "ARTICLE FORMING SYSTEM", now U.S. Pat. No. 4,897,031; which is a continuation of Ser. No. 07/004,275, filed Jan. 5, 1987, entitled "ARTICLE FORMING SYSTEM", now U.S. Pat. No. 4,773,182 which is a continuation of Ser. No. 07/613,080, filed May 22, 1984, now abandoned.

Said application Ser. No. 08/179,057, now U.S. Pat. No. 5,576,089, is also a continuation-in-part of application U.S. Ser. No. 08/095,331, filed Jul. 21, 1993, entitled "METHOD FOR CRIMPING A WRAPPER ABOUT A FLORAL GROUPING", now U.S. Pat. No. 5,428,939; which is a continuation-in-part of U.S. Ser. No. 07/963,882, filed Oct. 20, 1992, entitled "WRAPPING MATERIAL HAVING A PULL TAB AND PULL INDICIA FOR WRAPPING A FLORAL ARRANGEMENT AND METHOD", now U.S. Pat. No. 5,408,803; which is a continuation-in-part of U.S. Ser. No. 07/865,563, filed Apr. 9, 1992, entitled "METHODS FOR WRAPPING A FLORAL GROUPING", now U.S. Pat. No. 5,245,814; which is a continuation of U.S. Ser. No. 07/649,379, filed Jan. 31, 1991, entitled "METHOD FOR WRAPPING AN OBJECT WITH A MATERIAL HAVING PRESSURE SENSITIVE ADHESIVE THEREON", now U.S. Pat. No. 5,111,638; which is a continuation of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON", now abandoned.

Said application Ser. No. 07/963,882, now U.S. Pat. No. 5,408,803, is also a continuation-in-part of U.S. Ser. No. 07/893,586, filed Jun. 2, 1992, entitled "WRAPPING A FLORAL GROUPING WITH SHEETS HAVING ADHESIVE OR COHESIVE MATERIAL APPLIED THERETO", now U.S. Pat. No. 5,181,364; which is a continuation of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned; which is a continuation-in-part of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON", now abandoned.

Said application Ser. No. 08/095,331, now U.S. Pat. No. 5,428,939, is also a continuation-in-part of U.S. Ser. No. 07/923,117, filed Jul. 30, 1992, entitled "METHOD AND APPARATUS FOR PROVIDING A WRAPPER FOR A FLORAL GROUPING HAVING A FLAP FOR CLOSING THE UPPER END OR THE LOWER END OF THE WRAPPER", now U.S. Pat. No. 5,307,605; which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD", now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned; which is a continuation-in-part of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON", now abandoned.

Said application Ser. No. 08/095,331, now U.S. Pat. No. 5,428,939, is also a continuation-in-part of U.S. Ser. No. 07/940,930, filed Sep. 4, 1992, entitled "METHOD OF FORMING A FLOWER POT COVER WITH CRIMPED PORTION", now U.S. Pat. No. 5,361,482; which is a continuation-in-part of U.S. Ser. No. 07/926,098, filed Aug. 5, 1992, entitled "METHOD AND APPARATUS FOR FORMING A DECORATIVE COVER"; which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD", now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502, 358, filed Mar. 29, 1990, entitled "WRAPPING A FLORAL GROUPING WITH SHEETS HAVING ADHESIVE OR COHESIVE MATERIAL APPLIED THERETO", now abandoned; which is a continuation-in-part of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON", now abandoned.

Said application Ser. No. 07/940,930, now U.S. Pat. No. 5,361,482, is also a continuation-in-part of U.S. Ser. No. 07/687,701, filed Apr. 18, 1991, entitled "WRAPPING MATERIAL HAVING A SHAPE SUSTAINING ELEMENT AND METHOD", now abandoned; which is a continuation-in-part of Ser. No. 07/649,263, filed Jan. 30, 1991, entitled "FLEXIBLE VASE", now abandoned; which is a continuation of U.S. Ser. No. 07/248,960, filed Sep. 26, 1988, entitled "FLEXIBLE VASE", now abandoned; which is a continuation-in-part of U.S. Ser. No. 07/219,083, filed Jul. 13, 1988, entitled "ARTICLE FORMING SYSTEM", now U.S. Pat. No. 4,897,031; which is a continuation of U.S. Ser. No. 07/004,275, filed Jan. 5, 1987, entitled "ARTICLE FORMING SYSTEM", now U.S. Pat. No. 4,773,182; which is a continuation of U.S. Ser. No. 06/613,080, filed May 22, 1984, entitled "ARTICLE FORMING SYSTEM", now abandoned.

Said application Ser. No. 926,098 is also a continuation-in-part of U.S. Ser. No. 07/687,701, filed Apr. 18, 1991, entitled "WRAPPING MATERIAL HAVING A SHAPE SUSTAINING ELEMENT AND METHOD", now abandoned; which is a continuation-in-part of Ser. No. 07/649, 263, filed Jan. 30, 1991, entitled "FLEXIBLE VASE", now abandoned; which is a continuation of U.S. Ser. No. 07/248, 960, filed Sep. 26, 1988, entitled "FLEXIBLE VASE", now abandoned; which is a continuation-in-part of U.S. Ser. No. 07/219,083, filed Jul. 13, 1988, entitled "ARTICLE FORMING SYSTEM", now U.S. Pat. No. 4,897,031; which is a continuation of U.S. Ser. No. 07/004,275, filed Jan. 5, 1987, entitled "ARTICLE FORMING SYSTEM", now U.S. Pat. No. 4,773,182; which is a continuation of U.S. Ser. No. 06/613,080, filed May 22, 1984, entitled "ARTICLE FORMING SYSTEM", now abandoned.

FIELD OF THE INVENTION

This invention relates to decorative materials and more particularly but not by way of limitation to optical effect materials used to both wrap objects and as decorative shredded material or cut material, and methods of using same.

BRIEF DESCRIPTION OF THE DRAWINGS

FIG. 5 is a perspective view of another embodiment of an optical effect material wherein a third sheet of material is disposed adjacent and connected to an upper surface of a second sheet of material, which is also disposed adjacent a first sheet of material.

FIG. 6 is a perspective view of an optical effect material wherein a holographic design is provided on a sheet of material.

FIG. 7 is a perspective view of an optical effect material wherein a second sheet of material is disposed adjacent one surface of the sheet of material having a holographic design of FIG. 6.

FIG. 8 is a perspective view of a roll of optical effect material comprising a plurality of sheets of material, the sheets separated by perforations, and the roll partially unrolled to reveal a single sheet of the optical effect material still attached thereto.

FIG. 9 is a perspective view of a roll of optical effect material wherein the roll of optical effect material is disposed in a dispenser for separating the roll into separate sheets of optical effect material and dispensing the separate sheets of optical effect material from the roll of optical effect material.

FIG. 10 is a perspective view of a roll of optical effect material wherein the roll comprises a single sheet of optical effect material.

FIG. 18 is a perspective view of a floral grouping wrapped in a cylindrical fashion with an optical effect material.

FIG. 19 is a perspective view of an optical effect material having a flower pot disposed thereon.

FIG. 20 is a perspective view of the optical effect material of FIG. 19 partially wrapped about the flower pot.

FIG. 21 is a perspective view of the optical effect material wrapped about the flower pot.

FIG. 26 is a perspective view of a decorative covering formed from two sheets of material wherein one of the sheets of material is a shape sustaining material and at least one of the sheets of material is formed of an optical effect material.

FIG. 27 is a perspective view of another embodiment of the present invention, showing a wrapper comprising a sleeve for wrapping a floral grouping, constructed from the optical effect material of the present invention.

FIG. 28 is a perspective view of the wrapper of FIG. 27 having a floral grouping disposed inside of the wrapper with a bloom portion of the floral grouping disposed near a first end of the wrapper and a stem portion of the floral grouping extending from a second end of the wrapper.

FIG. 29 is a perspective view of the wrapper of FIG. 28 wherein the wrapper is crimped about the stem portion of the floral grouping, the crimped portion forming overlapping folds.

FIG. 30 is a perspective view of a modified wrapper similar to the wrapper shown in FIG. 29 but having a bonding material disposed on the outer surface of the sleeve, and showing the wrapper crimped about the stem portion of the floral grouping, the crimped portion forming overlapping folds.

FIG. 31 is a perspective view of another embodiment of a wrapper formed from the optical effect material of the present invention wherein the wrapper comprises a sleeve for covering a flower pot wherein the sleeve is provided with vertical and circumferential perforations, a portion of the vertical perforations of the sleeve being torn at the upper portion of the sleeve.

FIG. 32 is a perspective view of the wrapper of FIG. 31 wherein the vertical perforations of the sleeve are torn open and the circumferential perforations of the sleeve are partially torn.

FIG. 33 is a perspective view of the wrapper of FIGS. 31 and 32 wherein an upper portion of the sleeve has been torn away and a remaining lower portion of the sleeve forms a decorative cover about the flower pot.

FIG. 34 is a perspective view of still another embodiment of a wrapper for a floral grouping formed from the optical effect material of the present invention wherein the wrapper is sized to wrap a single bloom and single stem.

DESCRIPTION OF THE PREFERRED EMBODIMENTS

The Embodiments of FIGS. 1–5

Figure 1:
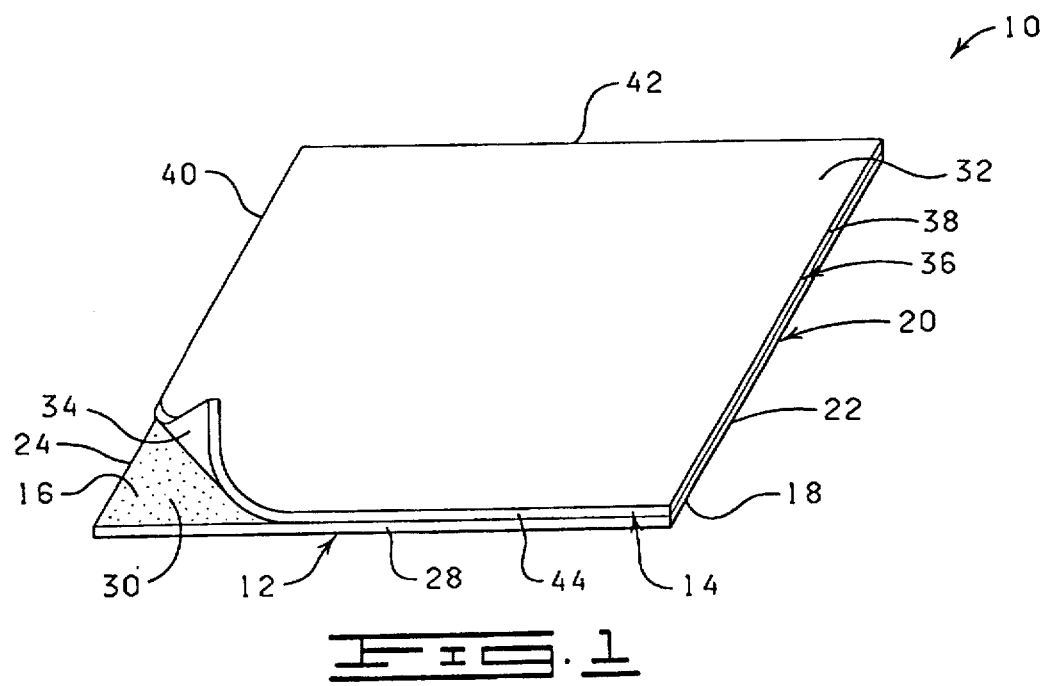
FIG. 1 is a perspective view of an optical effect material wherein a bonding material is disposed on an upper surface of a first sheet of material for connecting a second sheet of material to the first sheet of material.

Optical effect materials are frequently used in confetti, glitter, flakes, tinsel, labels, decals, stickers, sequins, decorative shredded material, such as, but not by way of limitation, decorative grasses (such decorative shredded material also being called herein "filamentary portions"), and other decorative wrapping material providing decorative covers for gifts, flower pots, floral groupings and the like, because of their changing, multi-color effect. In the past, optical effect materials have been expensive to produce. In some products, such as, but not by way of limitation, confetti, glitter, and decorative grasses, the products are sold by weight, and not volume. Therefore, it is expensive to supply the quantity of optical effect materials to meet the desired weight of these products.

The present invention describes a method which is significantly less expensive (that is, approximately one-third less expensive) to supply the same weight of optical effect materials for use as confetti, flakes, such as, for example, decorative metallic flakes, glitter, decorative flakes, and other very small decorative die-cut products, such as sequins, stars, and the like, and decorative shredded material, such as, but not by way of limitation, decorative grasses, and other decorative materials sold by weight rather than volume (the forgoing decorative items also termed herein "decorative elements"). Further, the present invention describes methods for wrapping floral groupings and flower pots with optical effect materials to provide decorative covers for the floral grouping and flower pot.

The term "optical effect material" as used herein is to understood to mean any material capable of changing appearance, such as perspective and/or color, as the angle of view of such material changes. Optical effect materials include, but are not limited to, iridescent materials, materials having one or more holograms and the like.

The present invention contemplates providing optical effect materials by laminating a light transmitting material such as, but not by way of limitation, a clear plastic sheet of material, or a tinted material, or a metallic material, to the iridescent material. Such a light transmitting material permits the iridescent qualities of the iridescent sheet of material to be transmitted and seen through the light transmitting material. Lamination of the light transmitting material to the iridescent material increases the weight of the resulting product while maintaining a selected volume range. The light transmitting material is much less expensive to produce or purchase than is a similar weight of iridescent material. In this manner, the manufacturer is provided a considerable cost savings, while maintaining the quality and standards of the products, as expected by consumers.

Similarly, lamination of light transmitting material to iridescent material is contemplated for providing a floral wrapping material and for providing a material to wrap flower pots or plant containers (or for providing preformed flower pot covers and other decorative covers). Differing effects are provided via the lamination technique, combined with other techniques, such as, but not by way of limitation, embossing the iridescent material and/or the light transmitting material and or other materials prior to lamination and then laminating two or more of the materials together.

Additional characteristics of the iridescent material, the light transmitting material, and other relevant materials are described herein, and present a variety of interesting, unusual, and decorative effects when two or more different materials are laminated together. Such a combination maintains the iridescent characteristics while creating additional interesting effects hereby creating a decorative optical effect material.

The present invention also contemplates the use of one or more sheets of a material having a holographic design on at least a portion thereof, or a combination of a sheet of material having a holographic design and a second sheet of material as an optical effect material to wrap floral groupings, flower pots or plant containers or for providing preformed flower pot covers and other decorative covers for flower pots and/or plant containers. Differing optical effects can be provided by embossing and/or printing the sheet of material having a holographic design and/or the second sheet of material.

In one embodiment a first sheet of material having a holographic design is used in combination with a second sheet of material having shape-sustaining properties so that a decorative cover having dead folds is formed by wrapping the first and second sheets of material about the flower pot or the plant container.

Similarly, lamination of a first sheet of material having a holographic design to a second sheet of material provides an optical effect material for use as decorative elements such as confetti, flakes, decorative grass and the like, or for wrapping floral groupings, flower pots, plant containers and the like or for providing preformed flower pot covers and other decorative covers for floral groupings, flower pots and plant containers. Differing optical effects are provided via the lamination technique, combined with other techniques, such as, but not by way of limitation, embossing and/or printing the first sheet of material having a holographic design or the second sheet of material prior to lamination of the first and second sheets.

Figure 2:
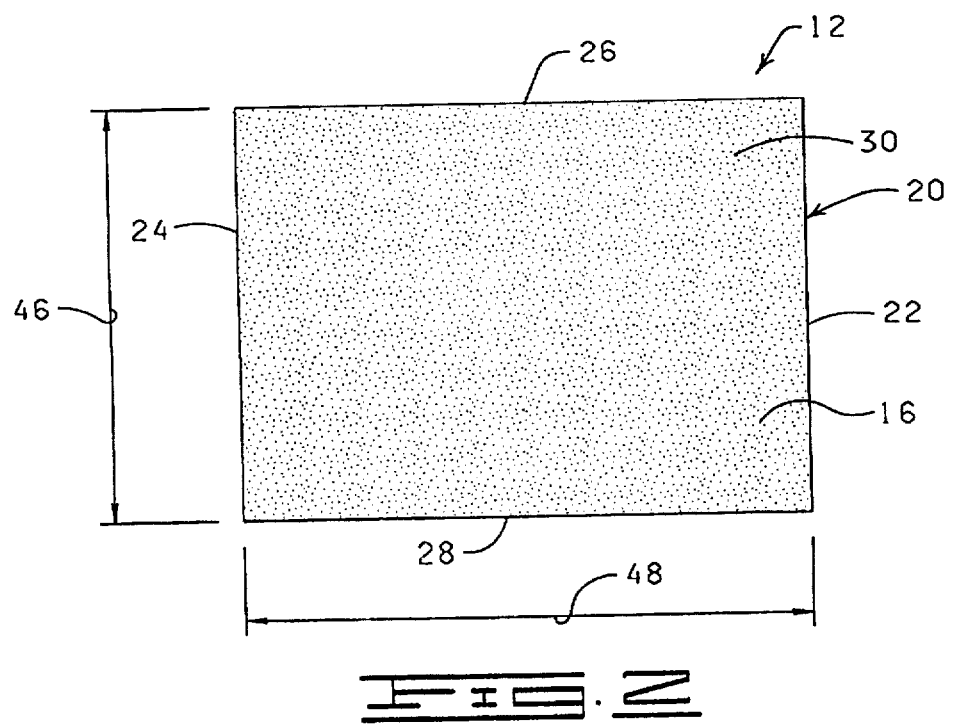
FIG. 2 is a top plan view of the first sheet of material of the optical effect material of FIG. 1 illustrating a bonding material on the upper surface of the first sheet of material.

Shown in FIG. 1 and designated therein by the general reference numeral 10 is an optical effect material comprising a first sheet of material 12 and a second sheet of material 14. The first sheet of material 12 has an upper surface 16, a lower surface 18, and an outer periphery 20. As shown in FIGS. 1 and 2, the first sheet of material 12 is also provided with a first side 22, a second side 24, a third side 26 and a fourth side 28.

A bonding material 30 may be disposed on the upper surface 16 of the first sheet of material 12. Alternatively, however, the first sheet of material 12 may be free of a bonding material 30. As shown in FIG. 2, the bonding material 30, if present, is disposed in a preferred embodiment substantially over the upper surface 16 of the first sheet of material 12. However, the bonding material 30 may also be disposed upon the upper surface 16 of the first sheet of material 12 in the form of one or more strips which extend between the third and fourth sides 26, 28 of the first sheet of material 12; or the bonding material 30 may also be disposed upon the upper surface 16 of the first sheet of material 12 in the form of spaced apart spots; or the bonding material 30 may also be disposed on the upper surface 16 of the first sheet of material 12 in any other geometric or non-geometric or asymmetric forms, and in any pattern, including fanciful patterns.

The first sheet of material 12 has a thickness in a range from about 0.1 mils to about 0.1 mils. Preferably, the first sheet of material 12 has a thickness in a range from about 0.4 mils to about 0.9 mils. The first sheet of material 12 is constructed of a material which is flexible.

The first sheet of material 12 may be any shape and a rectangular shape is shown in FIGS. 1 and 2 only by way of example. The first sheet of material 12, for example only, may also be square, circular or any other geometric, non-geometric, asymmetric or fanciful shape.

The first sheet of material 12 may be constructed of a single layer of material or a plurality of layers of the same or different types of materials. The layers of material comprising the first sheet of material 12 may be laminated together or connected together by any method known in the art.

In a preferred embodiment, the first sheet of material 12 is a light transmitting material constructed from a plastic film (Vifan BT medium slip biaxially oriented polypropylene film (clear)), having a thickness in a range from between about 0.4 mil and about 0.9 mil, available from Vifan Canada, Inc., Vifan street, Lanoraie d'Autray, Quebec, Canada JOK 1EO. An alternative plastic film (Hercules B523 oriented polypropylene packaging film (clear)), having a thickness in a range of between about 0.4 mil and about 0.9 mil, is available from Hercules incorporated, Hercules Plaza, Wilmington, Del. 19894.

The first sheet of material 12 is constructed from any suitable wrapping material that is capable of transmitting light into the iridescent material and permitting the iridescent effect of the iridescent material to be substantially maintained when the iridescent material is viewed through the light transmitting material. Further, the first sheet of material 12 must be capable of being wrapped about a flower pot or floral grouping, or used as a shredded decorative material, such as, but not by way of limitation, confetti, decorative grass, tinsel, glitter, sequins, flakes, and the like. Further, the first sheet of material 12 must also be suitable for making small die-cut items, such as decals, labels, stickers, stars, and the like. Preferably, the first sheet of material 12 comprises a naturally occurring polymer, such as cellophane, a synthetic polymeric film, metallized film, or combinations thereof.

The term "synthetic polymeric film" as used herein means a thermoplastic resinous material, such as, but not by way of limitation, a man-made polymer such as, but not by way of limitation, polypropylene. A synthetic polymeric film, as contemplated and described in detail herein, is relatively strong and is not as subject to tearing (substantially non-tearable), as might be the case with paper or foil.

Figure 3:
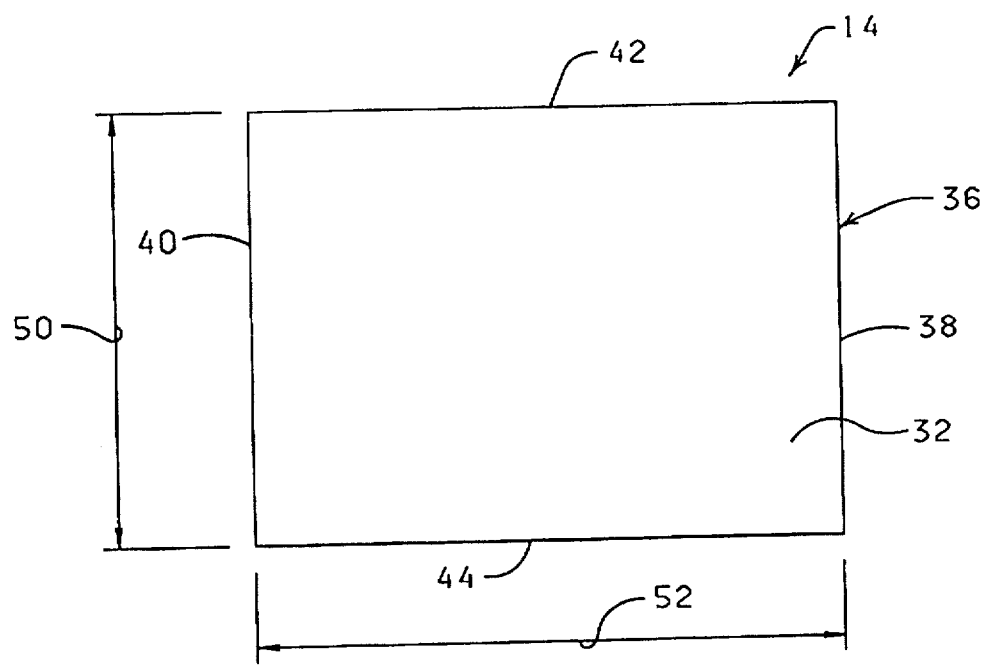
FIG. 3 is top plan view of the second sheet of material of the optical effect material of FIG. 1.

As shown in FIGS. 1 and 3, the second sheet of material 14 has an upper surface 32, a lower surface 34 (FIG. 1) and an outer periphery 36. The second sheet of material 14 also has a first side 38, a second side 40, a third side 42, and a fourth side 44. The second sheet of material 14 is a substantially flexible iridescent film having a thickness in a range of from about 0.1 mil to about 10 mils, and more preferably from about 0.1 mil to about 0.9 mils. A preferred iridescent film is IF-8531 R/S, manufactured by Mearl Corporation, 1050 Lower South Street, Peekskill, N.Y., 10566 having a thickness in a range of between about 0.4 mil and about 0.9 mil.

Iridescent articles and the methods of making such articles is disclosed in U.S. Pat. No. 3,231,645, entitled "Method of Making Iridescent Plastic Sheets," issued to Bolomey on Jan. 25, 1966; U.S. Pat. No. 3,481,663, entitled, "Iridescent Articles and Methods of Manufacture", issued to Greenstein on Dec. 12, 1969; U.S. Pat. No. 4,162,343, entitled "Multilayer Light-Reflecting Film", issued to Wilcox et al. on Jul. 24, 1979; U.S. Pat. No. RE31,780, entitled "Multilayer Light-Reflecting Film", issued to Cooper et al. on Dec. 25, 1984; U.S. Pat. No. 5,008,143, entitled, "Decorative Objects With Multi-Color Effects", issued to Armanini on Apr. 16, 1991; U.S. Pat. No. 5,089,318, entitled, "Iridescent Film With Thermoplastic Elastomeric Components", issued to Shetty et al. on Feb. 18, 1992, and U.S. Pat. No. 5,154,765, entitled, "Decorative Objects With Multicolor Effects", issued to Armanini on Oct. 13, 1992, all of which are hereby incorporated by reference herein.

As shown in FIG. 2, the first sheet of material 12 has a length 46 extending between the third and fourth sides 26 and 28 of the first sheet of material 12. The first sheet of material 12 also has a width 48 extending between the first and the second sides 22 and 24 of the first sheet of material 12.

As shown in FIG. 3, the second sheet of material 14 has a length 50 extending between the third and the fourth sides 42 and 44 of the second sheet of material 14. The second sheet of material 14 has a width 52 extending between the first and the second sides 38 and 40 of the second sheet of material 14.

The second sheet of material 14 may be any shape and a rectangular shape is shown in FIGS. 1 and 3 only by way of example. The second sheet of material 14 for example only, may also be square, circular or any other geometric, nongeometric, asymmetric or fanciful shape.

The second sheet of material 14 may be constructed of a single layer of material or a plurality of layers of the same or different types of materials, as long as the end result is a material having substantial iridescence which is evident on both the upper surface 32 and the lower surface 34 of the second sheet of material 14, and the thickness of the second sheet of material 14 falls within the preferable range of thickness described above. When the second sheet of material 14 comprises more than one layer, the layers of material comprising the second sheet of material 14 may be connected together in any manner known in the art.

In operation, the second sheet of material 14 is placed adjacent the first sheet of material 12 as shown in FIG. 1. In this position, the lower surface 34 of the second sheet of material 14 is disposed adjacent the upper surface 16 of the first sheet of material 12. The bonding material 30 is disposed on the upper surface 16 of the first sheet of material 12, or, alternatively, the bonding material 30 may be disposed on the lower surface 34 of the second sheet of material 14. In a further alternative, the bonding material 30 may be disposed on both the upper surface 16 of the first sheet of material 12 and the lower surface 34 of the second sheet of material 14.

The term "bonding material" when used herein means an adhesive, possibly a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" when used herein also means a lacquer, which may be applied to the sheet of material and, in this instance, heat, sound waves, or vibrations, also must be applied to effect the sealing of the lacquer.

The length 46 of the first sheet of material 12 is about equal to the length 50 of the second sheet of material 14 and the width 48 of the first sheet of material 12 is about equal to the width 52 of the second sheet of material 14 so that, when the first and the second sheets of material 12 and 14 are disposed adjacent each other, the outer periphery 20 of the first sheet of material 12 is substantially aligned with the outer periphery 36 of the second sheet of material 14. That is, the first side 22, the second side 24, the third side 26 and the fourth side 28 of the first sheet of material 12 is generally in alignment with the respective first side 38, the second side 40, the third side 42 and the fourth side 44 of the second sheet of material 14. It should be noted, therefore, that the first and the second sheets of material 12 and 14 each have substantially identical lengths 46 and 50, respectively, and substantially identical widths 48 and 52, respectively. When at least the first sheet of material 12 and the second sheet of material 14 are laminated together via any bonding material 30 described herein or known in the art, the optical effect material 10 illustrated in FIG. 1 is formed.

Figure 4:
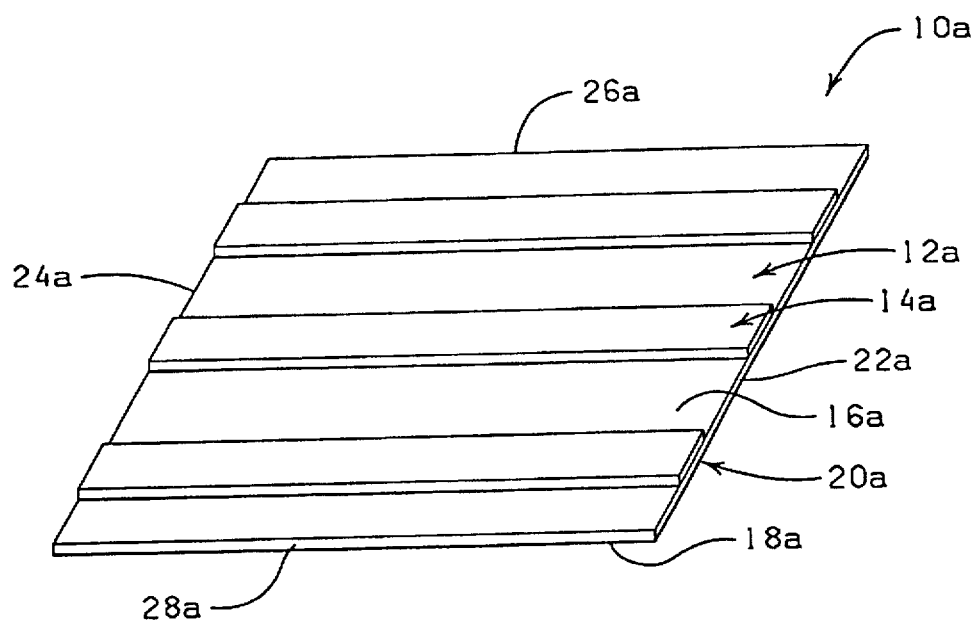
FIG. 4 is a perspective view of another embodiment of an optical effect material wherein a second sheet of the optical effect material comprises a plurality of strips of material which are spaced a distance apart and laminated to the upper surface of the first sheet of material.

Shown in FIG. 4 is another embodiment of an optical effect material 10a which comprises a first sheet of material 12a and a plurality of strips of a second material (only one of which is designated by the numeral 14a). The first sheet of material 12a has an upper surface 16a, a lower surface 18a, and an outer periphery 20a. The first sheet of material 12a is also provided with a first side 22a, a second side 24a, a third side 26a and a fourth side 28a.

The strips of the second material 14a are spatially disposed on the upper surface 16a of the first sheet of material 12a and extend between the first side 22a and the second side 24a of the first sheet of material 12a substantially as shown. The strips of the second material 14a are laminated or bonded to the first sheet of material 12a by any method known in the art.

The first sheet of material 12a has a thickness in a range from about 0.1 mils to about 10 mils. Preferably, the first sheet of material 12a has a thickness in a range from about 0.4 mils to about 0.9 mils. The first sheet of material 12a is constructed of a material which is flexible.

The first sheet of material 12a may be any shape and a rectangular shape is shown in FIG. 4 only by way of example. The first sheet of material 12a, for example only, may also be square, circular or any other geometric, nongeometric, asymmetric or fanciful shape.

The first sheet of material 12a is constructed from any suitable wrapping material that is capable of transmitting light into the iridescent material and permitting the iridescent effect of the iridescent material to be substantially maintained when the iridescent material is viewed through the light transmitting material. Further, the first sheet of material 12a must be capable of being wrapped about a flower pot or floral grouping, or used as a shredded decorative material, such as, but not by way of limitation, confetti, decorative grass, tinsel, glitter, sequins, flakes, and the like.

The first sheet of material 12a may be constructed of a single layer of material or a plurality of layers of the same or different types of materials. The layers of material comprising the first sheet of material 12a may be laminated together or connected together by any method known in the art.

In a preferred embodiment, the first sheet of material 12a is a light transmitting material constructed from a plastic film (Vifan BT medium slip biaxially oriented polypropylene film (clear)), having a thickness in a range from between about 0.4 mil and about 0.9 mil, available from Vifan Canada, Inc., Vifan street, Lanoraie d'Autray, Quebec, Canada JOK 1EO. An alternative plastic film (Hercules B523 oriented polypropylene packaging film (clear)), having a thickness in a range of between about 0.4 mil and about 0.9 mil, is available from Hercules Incorporated, Hercules Plaza, Wilmington, Del. 19894.

The strips of the second material 14a are strips of a substantially flexible iridescent film having a thickness in a range of from about 0.1 mil to about 10 mils, and more preferably from about 0.1 mil to about 0.9 mils. A preferred iridescent film is IF-8531 R/S, manufactured by Mearl Corporation, 1050 Lower South Street, Peekskill, N.Y., 10566 having a thickness in a range of between about 0.4 mil and about 0.9 mil.

The bonding material 30 used to laminate the first sheet of material 12 and the second sheet of material 14, or the first sheet of material 12a and the strips of the second material 14a together may also be tinted of colored by using a dye, pigment, or ink. In this manner, different coloring effect are provided, and the first sheet of material 12 and/or the second sheet of material 14, or the first sheet of material 12a and the strips of the second material 14a may be given a colored appearance by use of a colored bonding material as the bonding material 30. U.S. Pat. No. 5,147,706 described immediately above provides one water based ink which may be used to tint either the first and second sheets of material 12 or 14 or the first sheet of material 12a and the strips of the second material 14a which may be used to tint the bonding material 30.

The use of a light transmitting material, such as a plastic film, for example, as the first sheets of material 12 and 12a permits the iridescence of the second sheet of material 14 or the strips of the second material 14a to substantially be maintained through the first sheets of material 12 and 12a. However, when the second sheet of material 14 is laminated to a first sheet of material 12, or the strips of the second material 14a are laminated to the first sheet of material 12a, and the first sheets of material 12 and 12a are either a foil or a metallized film (tinted or non-tinted), then the iridescent quality of the second sheet of material 14 and the strips of the second material 14a are obscured by their respective first sheets of material 12 and 12a when the optical effect materials 10 and 10a are shredded into small pieces, flakes, or the like. Therefore, when the first sheet of material 12 of the optical effect material 10 and when the first sheet of material 12a of the optical effect material 10a are a foil or metallized film, additional adhesive, an additional sheet of clear or tinted material, or additional reflective material (such as, but only by way of example, oxide flakes) must be provided between the first and second sheets of material 12 and 14 of the optical effect material 10 and the first sheet 14a and the strips of the second material 14a of the optical effect material 10a to permit optimal light to be reflect back through the second sheet of material 14 from the first sheet of material 12 of the optical effect material 10 or to reflect back through the strips of the second material 14a from the first sheet of material 12a of the optical effect material 10a to substantially maintain, for small pieces of decorative material, the iridescent quality of the second sheet of material 14 or the strips of the second material 14a. It is notable that when large first and second sheets of material 12 and 14 or a large first sheet of material 14a and strips of the second material 14a are laminated together and not shredded, the iridescence of the second sheet of material 14 and the iridescence of the strips of the second material 14a appear substantially intact without the use of an additional sheet of material, an adhesive, or oxide flakes.

Shown in FIG. 5 is another embodiment of an optical effect material 10b of the present invention. The optical effect material 10b comprises a first sheet of material 12b, a second sheet of material 14b and a third sheet of material 54. The first and second sheets of material 12b and 14b are identical in construction to the first and second sheets 12 and 14 of the optical effect material 10 hereinbefore described in detail. The third sheet of material 54, which desirably possesses substantially identical characteristics and qualities as the first sheet of material 12b, has an upper surface 56, a lower surface 58, and an outer periphery 60. The third sheet of material 54 also has a first side 62, a second side 64, a third side 66 and a fourth side 68.

The third sheet of material 54 may be laminated to the upper surface 32b of the second sheet of material 14b in forming the optical effect material 10b. In this instance, the third sheet of material 54 may have substantially the same characteristics and qualities as the first sheet of material 12b or the third sheet of material 54 may have different characteristics and qualities than the first sheet of material 12b. The third sheet of material 54 may also be laminated to the remaining non-laminated surface of the first sheet of material 12b, that is, the lower surface 18b of the first sheet of material 12b. It will therefore be appreciated that multiple sheets of material similar to the first sheet of material 12b may be used. Moreover, when multiple sheets of material are used, the sheets of material need not be uniform in size or shape. That is, one sheet of material may extend beyond at least a portion of the outer periphery of another sheet of material. Finally, it will be appreciated that all sheets of material shown in all embodiments herein are substantially flat.

A bonding material 30b may be disposed on the upper surface 32b of the second sheet of material 14b, or, alternatively, to any other surfaces of any sheets of material described herein. The bonding material 30b may be applied as a strip or as spots or other shapes. One method for disposing a bonding material, in this case an adhesive, on a sheet of material is described in U.S. Pat. No. 5,111,637 entitled "Method For Wrapping A Floral Grouping" issued to Weder et al., on May 12, 1992 and which is hereby incorporated herein by reference. Another method for disposing a bonding material in order to laminate two sheets of material is described in U.S. Pat. No. 4,297,811 entitled "Laminated Printed Foil Flower Pot Wrap With Multicolor Appearance, issued to Weder on Nov. 3, 1981.

The bonding material used to laminate the first sheet of material 12b and the second sheet of material 14b and the bonding material used to laminate the second sheet of material 14b and the third sheet of material 54, may also be tinted of colored by using a dye, pigment, or ink. In this manner, different coloring effect are provided, and the first sheet of material 12b and/or the second sheet of material 14b, and/or the third sheet of material 54 may be given a colored appearance by use of a colored bonding material as herein before described.

The use of a light transmitting material, such as a plastic film, for example, as the first and third sheets of material 12b and 54 permits the iridescence of the second sheet of material 14b to substantially be maintained through the first sheet of material 12b and the third sheet of material 54. However, when the second sheet of material 14b is laminated to the first sheet of material 12b and to the third sheet of material 54 and the first and third sheets of material 12b and 54 are either a foil or a metallized film (tinted or non-tinted), the iridescent quality of the second sheet of material 14b is obscured by the first and third sheets of material 12b and 54 when the optical effect materials 10b is shredded into small pieces, flakes, or the like. Therefore, when the first sheet of material 12b and the third sheet of material 54 of the optical effect material 10b are a foil or metallized film, additional adhesive, an additional sheet of clear or tinted material, or additional reflective material (such as, but only by way of example, oxide flakes) must be provided between the first and second sheets of material 12b and 14b and between the second and third sheets of material 14b and 54 of the optical effect material 10b to permit light to be reflect back through the second sheet of material 14b from the first and third sheets of material 12b and 54 to substantially maintain, for small pieces of decorative material, the iridescent quality of the second sheet of material 14b. It is notable that when large first, second and third sheets of material 12b, 14b and 54 are laminated together and not shredded, the iridescence of the second sheet of material 14b appears substantially intact without the use of an additional sheet of material, an adhesive, or oxide flakes.

Further, the first, second, and/or third sheets of material 12b, 14b, and 54 of the optical effect material 10b may consist of designs or decorative patterns which are printed, etched, and/or embossed thereon using inks or other printing materials. An example of an ink which may be applied to the surface of the first, second and/or third sheets of material 12b, 14b and 54 of the optical effect material 10b is described in U.S. Pat. No. 5,147,706 entitled "Water Based ink On Foil And/Or synthetic organic polymer" issued to Kingman on Sep. 15, 1992 and which is hereby incorporated herein by reference. In addition, the first, second and/or third sheets of material 12b, 14b and 54b may have various colorings, coatings, embossings, flocking and/or metallic finishes, or other decorative surface ornamentation applied separately or simultaneously or may be characterized totally or partially by pearlescent, translucent, transparent, iridescent or the like qualities. Each of the above-named characteristics may occur alone or in combination and may be applied to the upper and/or lower surfaces of the first, second and/or third sheets of material 12b, 14b and 54. Moreover, each surface of the first, second, and/or third sheets of material 12b, 14b and 54 may vary in the combination of such characteristics. The first and/or third sheets of material 12b and 54 may be opaque, translucent, clear or tinted transparent.

It will be appreciated that the optical effect materials 10, 10a and 10b herein before described may be in the form of a sheet of material as shown in FIGS. 1,4 and 5, or in the form of a pad of material and/or rolls of material, the latter two being described in detail herein after.

Embodiments of FIGS. 6 and 7

Shown in FIG. 6 is yet another embodiment of an optical effect material 10c which comprises a sheet of material 12c having a holographic design 70 provided thereon. The sheet of material 12c has an has an upper surface 16c, a lower surface 18c, and an outer periphery 20c. The holographic design 70 is illustrated in FIG. 6 as being provided on the lower surface 18c of the sheet of material 12c. However, it should be understood that the holographic design 70 can be provided on the upper surface 16c, or both the upper and lower surfaces 16c and 18c of the sheet of material 12c, and the holographic design 70 can be provided on only a portion of the sheet of material 12c or over the entire upper and/or lower surfaces 16c and 18c of the sheet of material 12c, depending on the intended use of the optical effect material 10c.

The sheet of material 12c is also provided with a first side 22c, a second side 24c, a third side 26c and a fourth side 28c. The sheet of material 12c shown in FIG. 6 is generally rectangularly shaped; however, the sheet of material 12c could be square, circular or have any other geometric, non-geometric, asymmetric or fanciful configuration desired in a particular application.

The sheet of material 12c has a thickness in a range of from about 0.1 mil to about 30 mils, preferably from about 0.1 mil to about 10 mils, and more preferably from about 0.4 mil to about 0.9 mil. The thickness of the sheet of material 12c should be selected so that the sheet of material 12c possesses flexibility to permit the sheet of material 12c to be easily shaped about an object to be covered, such as a floral grouping, a flower pot or a pot container (as will be described in more detail hereinafter). The sheet of material 12c is constructed of any one of the group of materials comprising paper, a naturally occurring polymer such as cellophane, a synthetic polymer, metallized film, foil or combinations thereof.

The term "holographic design" as used herein is to be understood to mean a three-dimensional image most visible from an oblique angle which is created by sophisticated techniques involving lasers and precise optical instruments. The unique properties of holographic designs are that they appear to float in space, are true-to-life and can change perspective, that is, permit one to look around corners and watch hidden features of the image come to light.

Further, the "holographic design" can be in any geometric form, or any combination of geometric forms, for example, squares, round spots, triangles, rectangles, octagonals, or the like (not shown); or any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional) animal forms (real and fictional), cartoon characters, and/or plant forms. Such holographic designs may comprise a color, or a portion of a color, or any combination of colors. Alternatively, at least a portion of the holographic design may be colorless, translucent, transparent, opaque, pearlescent, iridescent, or the like.

When employing the optical effect material 10c to form a decorative cover about a floral grouping, a flower pot, a pot container, or any other item for which a decorative cover is desired, a bonding material 30c may be disposed on the upper surface 16c of the sheet of material 12c generally near and extending a distance from the first side 22c of the sheet of material 12c such that the bonding material 30c extends generally between the third and fourth sides 26c and 28c of the sheet of material 12c substantially as shown. It should be noted that when the optical effect material 10c is used to produce decorative elements such as confetti, flakes, and the like, or to produce decorative shredded materials such as decorative grass, the bonding material 30c is omitted from the sheet of material 12c. However, when employing the bonding material 30c, it should be understood that the bonding material 30c may be disposed on the upper surface 16c of the sheet of material 12c in the form of one or more strips which extend between the third and fourth sides 26c and 28c of the sheet of material 12c; or the bonding material 30c may be disposed upon the upper surface 16c of the sheet of material 12c in the form of space apart spots; or the bonding material 30c may be disposed on the upper surface 16c of the sheet of material 12c in any other geometric or non-geometric for asymmetric form, and in any pattern, including fanciful patterns.

In addition to the holographic design 70, the sheet of material 12c may have various colorings, coatings, embossings, printed matter, flocking and/or metallic finishes, or other decorative surface ornamentation applied separately or simultaneously, both in registry or out of registry with one another and/or the holographic design 70, which cooperate with the holographic design 70 to provide the decor of a decorative cover formed about a floral grouping or a flower pot with the sheet of material 12c or any of the other embodiments of an optical effect material disclosed herein.

Shown in FIG. 7 is another embodiment of an optical effect material 10d which comprises a first sheet of material 12d having a holographic design 70d and a second sheet of material 14d. The first sheet of material 12d has an upper surface 16d, a lower surface 18d and an outer periphery 20d. The holographic design 70 is illustrated in FIG. 6 as being on the lower surface 18d of the first sheet of material 12d. However, it should be understood that the holographic design 70 can be provided on the upper surface 16d, or both the upper and lower surfaces 16d and 18d of the sheet of material 12d, and the holographic design 70 can be provided on only a portion of the sheet of material 12d or over the entire upper and/or lower surfaces 16d and 18d of the sheet of material 12d, depending on the properties of the first and second sheets of material 12d and 14d and the intended use of the optical effect material 10d.

The first sheet of material 12d is also provided with a first side 22d, a second side 24d, a third side (not shown) and a fourth side 28d. The sheet of material 12d shown in FIG. 7 is generally rectangularly shaped; however, the sheet of material 12d could be square, circular or have any other geometric, non-geometric, asymmetric or fanciful configuration desired in a particular application.

The first sheet of material 12d, in addition to the holographic design 70 on the lower surface 18d thereof, may have various colorings, coatings, embossings, printings, flocking and/or metallic finishes, or other decorative surface ornamentation applied separately or simultaneously, both in registry and out of registry with one another and/or the holographic design 70d, which cooperate with the holographic design 70d to enhance the decor of decorative covers for floral groupings and flower pots as will be described in more detail hereinafter.

The first sheet of material 12d has a thickness in a range of from about 0.1 mil to about 30 mils, preferably from about 0.1 mil to about 10 mils, and more preferably from about 0.4 mil to about 0.9 mil. The thickness of the first sheet of material 12d should be selected so that the first sheet of material 12d possesses flexibility and can be easily shaped about the object to be covered, such as a floral grouping, a flower pot or a pot container (as will be described in more detail hereinafter). The first sheet of material 12d is constructed of any one of the group of materials comprising paper, a naturally occurring polymer such as cellophane, a synthetic polymer, metallized film, foil or combinations thereof.

The second sheet of material 14d has an upper surface 32d, a lower surface 34d, and an outer periphery 36d. The second sheet of material 14d also has a first side 38d, a second side 40d, a third side 42d and a fourth side 44d. The second sheet of material 14d has a thickness in the range of from about 0.1 mil to about 30 mils, preferably from about 0.1 mil to about 10 mils, and more preferably from about 0.4 to about 0.9 mil. The thickness of the second sheet of material 14d should be selected so that the combination of the first sheet of material 12d and the second sheet of material 14d possesses the desired flexibility to permit the optical effect material 10d to be easily wrapped about an object to be covered, such as a floral grouping, a flower pot or a pot container (as will be described in more detail hereinafter).

The second sheet of material 14d shown in FIG. 7 is generally rectangularly shape and is provided with a size substantially corresponding to the size of the first sheet of material 12d. However, it should be noted that the second sheet of material 14d can have a different overall dimension than the dimensions of the first sheet of material 12d and the second sheet of material 14d can possess the same or a different configuration than the first sheet of material 12d.

The second sheet of material 14d may be constructed of a single layer of material or a plurality of layers of the same or different types of material. When the second sheet of material comprises more than one layer, the layers of the material comprising the second sheet of material 14d may be connected together in any manner known in the art.

In operation, the second sheet of material 14d is placed adjacent the first sheet of material 12d so that the lower surface 34d of the second sheet of material 14d is disposed adjacent the upper surface 16d of the first sheet of material 12d. If desired, a bonding material (not shown) can be disposed on the upper surface 16d of the first sheet of material 12d, or, alternatively, a bonding material may be disposed on the lower surface 34d of the second sheet of material 14d in the same manner that the bonding material 30 is disposed on one of the upper and lower surfaces 16 and 34 of the first and second sheets of material 12 and 14, respectively, of the optical effect material 10 heretofore described with reference to FIG. 1.

As previously stated, the first and second sheets of material 12d and 14d may be sized so that when the first and second sheets of material 12d and 14d are disposed adjacent each other, the outer periphery 20d of the first sheet of material 12d is substantially aligned with the outer periphery 36d of the second sheet of material 14d. That is, the first side 22d, the second side 24d, the third side (not shown) and the fourth side 28d of the first sheet of material 12d are generally in alignment with the respective first side 38d, second side 40d, the third side 42d and the fourth side 44d of the second sheet of material 14d. The first and second sheets of material 12d and 14d can, if desired, be laminated together via any bonding material described herein or known in the art, or the optical effect material 10d can consist of individual sheets of the first and second sheets of material 12d and 14d.

Embodiments of FIGS. 8–10

Referring now to FIG. 8, a roll 72 of an optical effect material, such as the optical effect material 10c, is illustrated. Preferably, the roll 72 of the optical effect material 10c consists of a plurality of sheets of material 12c which are connected by perforations 74. Thus, the roll 72 of the optical effect material 10c permits one sheet of material 12c to be withdrawn from the roll 72 of optical effect material 10c and then severed or disconnected from the roll 72 of the optical effect material 10c. Alternatively, the roll 72 of the optical effect material 10c may simply be formed as a continuous roll of optical effect material 10c wherein a selected quantity of the optical effect material 10c may be removed from the roll 72 by unrolling a portion of the roll 72 of the optical effect material 10c and thereafter using a separate cutting element (not shown) to sever the unrolled portion of the optical effect material 10c to provide the sheet of material 12c. While the roll 72 of the optical effect material 10c has been described as being a roll of the optical effect material 10c, it is to be understood that the roll 72 of the optical effect material can also be formed of the optical effect materials 10, 10a, 10b and 10d hereinbefore described.

The roll 72 of the optical effect material 10c may also be contained within a dispenser 76, as illustrated in FIG. 9. When the roll 72 of the optical effect material 10c is disposed in the dispenser 76, a portion of the optical effect material 10c is again unrolled and a serrated cutting edge 78 of the dispenser 76, or a separate cutting element (not shown), severs the unrolled portion of the optical effect material 10c from the roll 72 of the optical effect material 10c to provide the sheet of material 12c. Any number of sheets of optical effect material 10c may form the roll 72 of the optical effect material 10c as long as it is possible to withdraw at least one sheet of the optical effect material 10c from the roll 72 as described herein. A roll 72 of optical effect material 10c formed by one sheet of material 12c is shown in FIG. 10.

Figure 11:
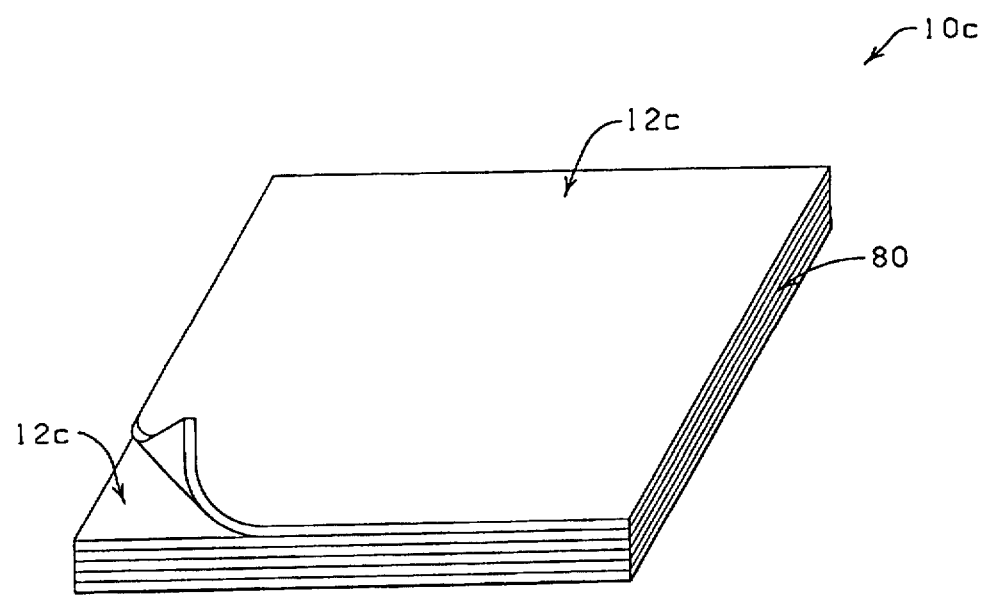
FIG. 11 is a perspective view of a pad of optical effect material having an edge of a top sheet of optical effect material lifted so as to expose a second sheet of the pad.
Figure 12:
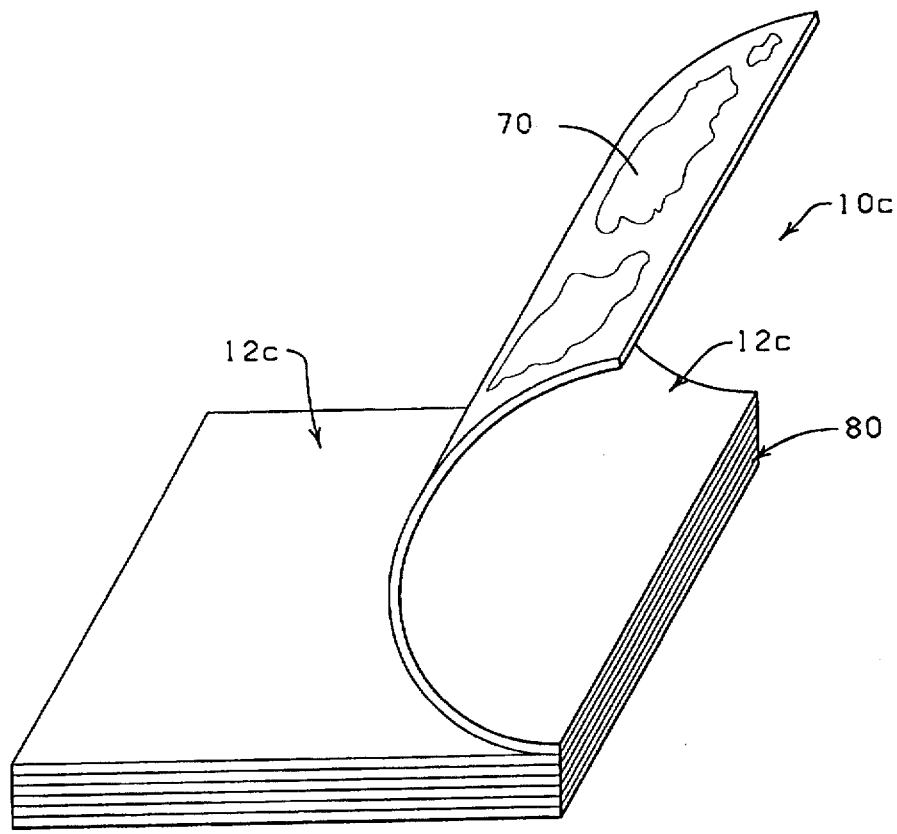
FIG. 12 is a perspective view of the pad of optical effect material shown in FIG. 11, but showing the top sheet of optical effect material being detached from the pad.

Embodiments of FIGS. 11 and 12

Shown in FIG. 11 is a pad 80 of the optical effect material 10c formed from a plurality of sheets of material 12c which are stacked and aligned one on top of the other to form the pad 80 of the optical effect material 10c. While the pad 80 is illustrated as comprising a plurality of sheets of material 12c of the optical effect material 10c, it should be understood that the optical effect materials 10, 10a, 10b and 10d hereinbefore described can also be used to provide the pad 80. However, only the use of the optical effect material 10c in the formation of the pad 80 of sheets of material 12c will be described hereinafter.

The pad 80 comprises a plurality of sheets of material 12c of the optical effect material 10c (one edge of the top sheet of the material 12c being lifted for illustration purposes only). The sheets of material 12c of the optical effect material 10c are generally aligned, and are connected together via a bonding material (not shown), such as, but not by way of limitation, a coadhesive or a pressure sensitive adhesive.

When employing the pad 80 of sheets of material 12c of the optical effect material 10c to form a decorative cover about a floral grouping or a flower pot, the floral grouping or flower pot may be placed on the top sheet of material 12c in the pad 80 and one or more sheets of the optical effect material 10c may be wrapped about the floral grouping or flower pot and removed from the pad 80; or the top sheet of material 12c may be lifted and removed from the pad 80, as shown in FIG. 12, whereby the next sheet of material 12c becomes the new top sheet. This process is repeated until all of the sheets of material 12c in the pad 80 are removed. Methods of forming a pad containing sheets of material to wrap floral groupings, and removing the sheets of material from the pad to wrap about a floral grouping are described in U.S. Pat. No. 5,181,363 entitled "Wrapping A Floral Grouping With Sheets Having Adhesive Or Cohesive Material Applied Thereto" issued to Weder on Jan. 26, 1993, which is hereby expressly incorporated by reference herein.

Figure 13:
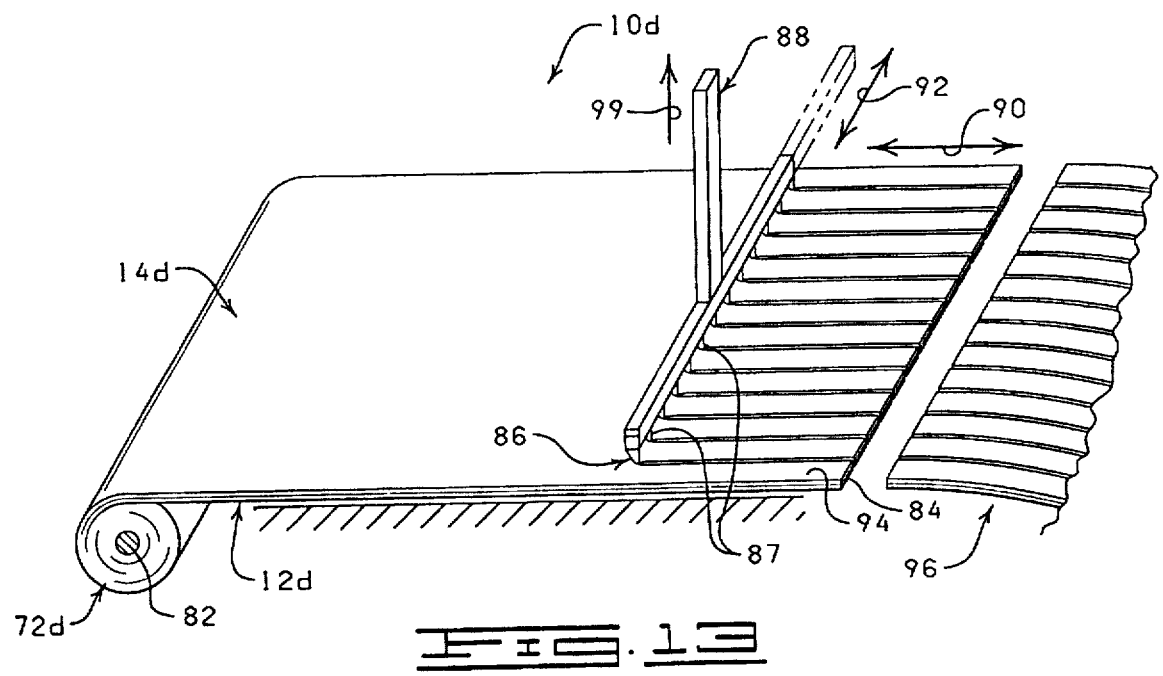
FIG. 13 is a perspective view of a roll of optical effect material wherein a first sheet and a second sheet are combined to form the optical effect material and illustrating a knife edge being actuated by an actuator to cut at least a portion of the roll of optical effect material into elongated strips of optical effect material.
Figure 14:
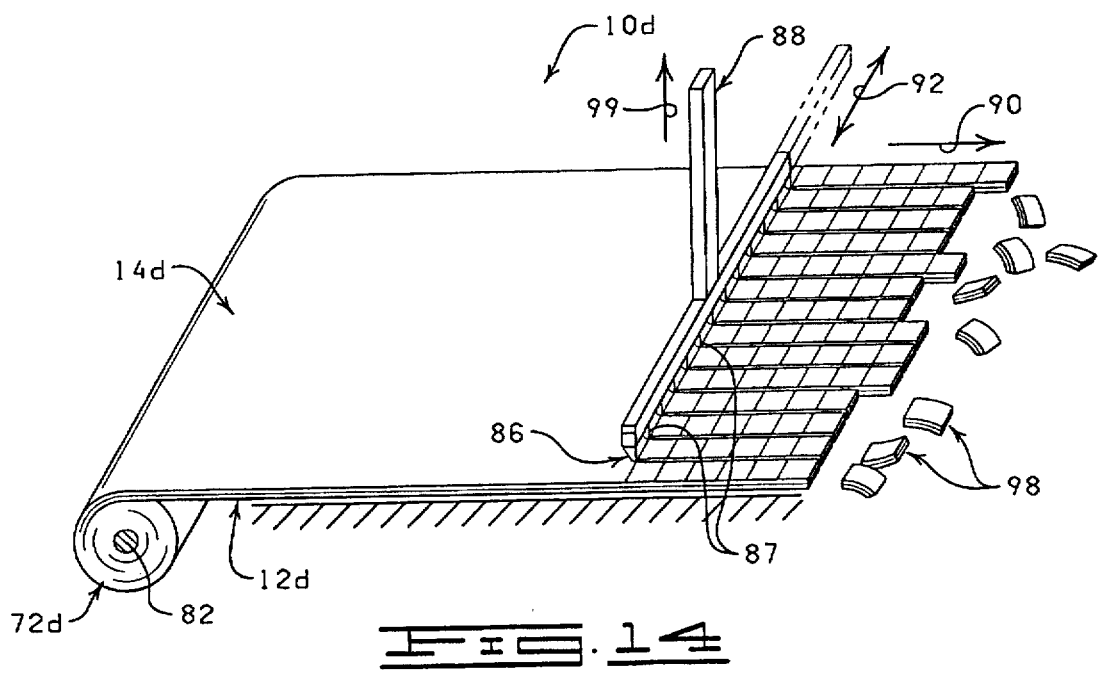
FIG. 14 is a perspective view of the roll of optical effect material of FIG. 13 showing the knife edge being actuated in a second direction so as to cut the elongated strips of optical effect material into small pieces of optical effect material.

Embodiments of FIGS. 13 and 14

Shown in FIG. 13 and 14 is a modified roll 72d of the optical effect material 10d which comprises at least a first sheet of material 12d and a second sheet of material 14d which may or may not be laminated or otherwise connected together as previously described in detail with reference to FIG. 7. The roll 72d of optical effect material 10d is constructed similar to the roll 72 of optical effect material 10c described before, except the roll 72d of optical effect material 10d is not disposed in a dispenser but is supported on a mounted shaft 82. The optical effect material 10d is withdrawn from the roll 72d of optical effect material 10d via a leading edge 84 until a predetermined length of the optical effect material 10d has been withdrawn from the roll 72d. In this position, a portion of the optical effect material 10d is disposed under a knife assembly 86 having a plurality of cutting elements 87. The knife assembly 86 is connected to an actuator 88 adapted to move the knife assembly 86 in a first direction 90 and in a second direction 92. When the predetermined length of the optical effect material 10d has been withdrawn from the roll 72d of optical effect material 10d, the actuator 88 moves the knife assembly 86 in the first direction 90 to a position wherein the cutting element 87 of the knife assembly 86 severingly engages the optical effect material 10d to shreddingly cut a plurality of elongated strips 94 of the optical effect material 10d.

In another optional mode, the actuator 88 may rotate the knife assembly 86 to the second cutting direction 90 wherein the cutting elements 87 of the knife assembly 86 severingly re-engages the plurality of elongated strips 94 of the optical effect material 10d, thereby causing the elongated strips 94 of the optical effect material 10d to be severed into segments of decorative grass 96 (FIG. 13) or into small pieces 98, for use as glitter, confetti, tinsel, and the like, for example (it will be appreciated that this process is represented schematically in the drawings). The actuator 88 may comprise a hydraulic or pneumatic cylinder or a motor and gear arrangement or any other form of arrangement suitable for moving the knife assembly 86 in the first direction 90 and, when desired, in the second direction 92. After the cutting elements 87 of the knife assembly 86 have cuttingly severed the desired portion of sheet of optical effect material 10d from the roll 72a of optical effect material 10d, the actuator 88 is actuated to move the knife assembly 86 in a storage direction 99 to a storage position disposed a distance above the optical effect material 10d as opposed to the cutting positions previously described. Alternatively, the leading edge 84 of the sheet of optical effect material 10c may be run across a first knife edge (not shown) set in a support surface (also not shown) to form the elongated strips 94 of optical effect material 10d, wherein the actuator 88 actuates a second knife edge (not shown) to cross-cut the elongated strips 94 of optical effect material 10d into segments of decorative grass 96 or small pieces 98 for use as glitter, confetti, tinsel and the like. Apparatus and methods for making decorative shredded materials and the like is disclosed in U.S. Pat. No. 4,646,388, entitled, "Apparatus For Producing Weighed Charges Of Loosely Aggregated Filamentary Material", issued to Weder et al. on Mar. 3, 1987, which is hereby expressly incorporated by reference herein.

When dealing with shredded optical effect material, especially shredded iridescent material and non-iridescent material, the process of combining the two in approximately equal quantities is time consuming and costly. It is difficult, after a material is shredded, to mix the two dissimilar materials together. The embodiment described in detail hereinbefore would eliminate the need for costly and time-consuming "mixing" of the two types of shredded material. This process is also advantageous for mixing even smaller pieces of material, such as sequins, labels, decals, glitter, tinsel, and the like.

Embodiments of FIGS. 15–18

As noted previously, the optical effect materials 10, 10a, 10b, 10c and 10d may be used to wrap a floral grouping. The term "floral grouping" as used herein means cut fresh flowers, artificial flowers, a single flower as well as fresh and/or artificial plants or other floral materials and such term includes other secondary plants and/or ornamentation or artificial or natural materials which add to the aesthetics of the overall floral arrangement. The floral grouping may comprise a bloom (or foliage) portion and a stem portion. However, it will be appreciated that the floral grouping may consist of only a single bloom or only foliage. The term "floral grouping" may be used interchangeably herein with the term "floral arrangement".

The wrapping of the floral grouping will now be described with reference to FIGS. 15–17 using the optical effect material 10c depicted in FIG. 6. However, it is to be understood that floral groupings can be wrapped in a similar manner with the optical effect materials 10, 10a, 10b and 10d.

Figure 15:
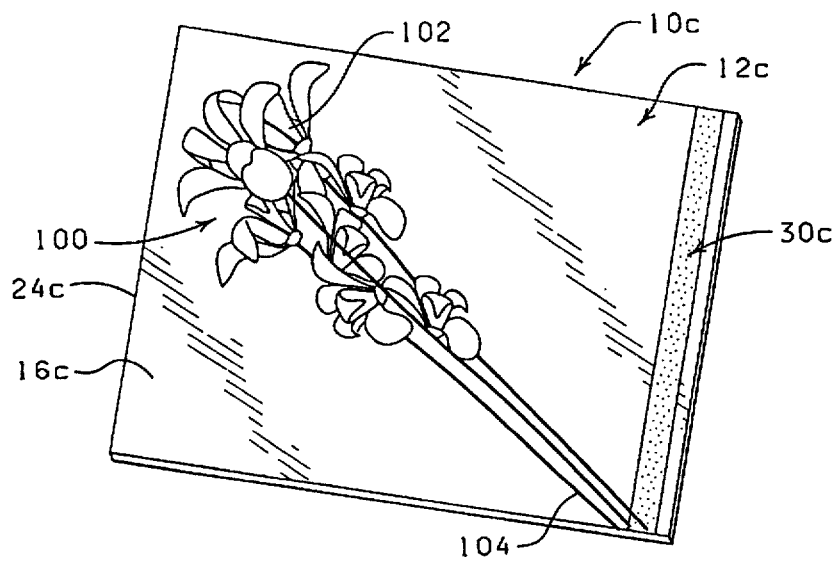
FIG. 15 is a perspective view of a floral grouping disposed on an optical effect material.

A floral grouping 100 having a bloom portion 102 and a stem portion 104 is disposed on the upper surface 16c of the sheet of material 12c of the optical effect material 10c (FIG. 15). The sheet of material 12c then is wrapped about the floral grouping 100 by rolling the sheet of material 12c in a direction 106 about the floral grouping 100 (FIG. 16). The sheet of material 12c is continued to be rolled about the floral grouping 100 until a portion of the bonding material 30c is disposed adjacent a portion of the lower surface 18c of the sheet of material 12c and brought into bonding contact or engagement therewith (FIG. 17), thereby bondingly connecting the upper surface 16c of the sheet of material 12c to a portion of the lower surface 18c of the sheet of material 12c for cooperating to secure the sheet of material 12c in a wrapped condition about the floral grouping 100 to provide a decorative cover or wrapper 108 for the floral grouping 100, as shown in FIG. 17, wherein the holographic design 70 of the sheet of material 12c is readily visible and provides a desired optical effect to the decorative cover or wrapper 108. Thus, the holographic design 70 constitutes at least a portion of the decor of the decorative cover or wrapper 108.

Figure 17:
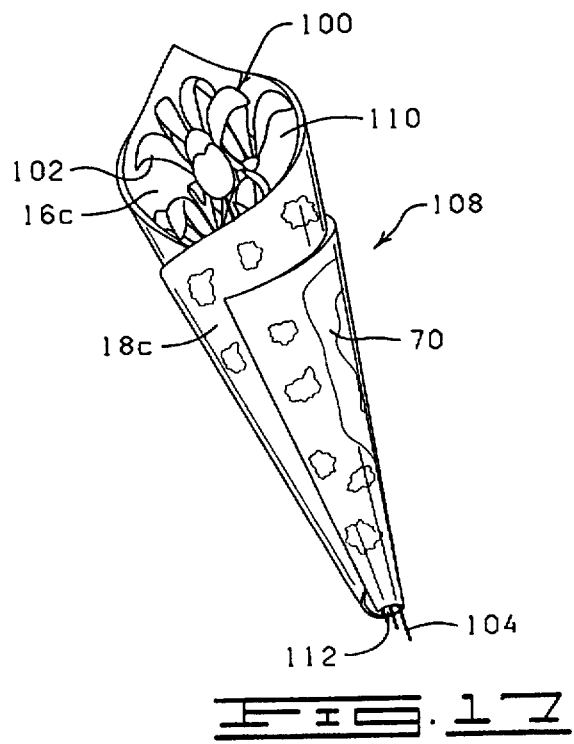
FIG. 17 is a perspective view of the floral grouping wrapped in a conical fashion.

When the sheet of optical effect material 12c is wrapped about the floral grouping 100 as shown in FIG. 17, the decorative wrapper 108 is provided with a conical configuration having an open upper end 110 and an open lower end 112. The decorative wrapper 108 covers a portion of the bloom portion 102 of the floral grouping 100 and a portion of the stem portion 104 of the floral grouping 100 extends through the open lower end 112 of the decorative wrapper 108. The decorative wrapper 108 is tightly wrapped about the stem portion 104 of the floral grouping 100. The bonding material 30c on the sheet of material 12c of the sheet of optical effect material 10c may contact and engage some of the stem portion 104 of the floral grouping 100 to cooperate in securing the decorative wrapper 108 tightly about the stem portion 104 and to prevent the floral grouping 100 from slipping or moving within the decorative wrapper 108.

At least a portion of the floral grouping 100 is disposed within the decorative wrapper 108. In some applications, the stem portion 104 of the floral grouping 100 extends through the open lower end 112 of the wrapper 108, as described before. In other applications, the stem portion 104 does not extend through the open lower end 112 of the wrapper 108, as described before. In other applications, the stem portion 104 does not extend through the open lower end 112 of the decorative wrapper 108. In some applications, the decorative wrapper 108 is tightly wrapped about the stem portion 104 of the floral grouping 100 and the bloom portion 102 of the floral grouping 100 is disposed near the open upper end 110 of the decorative wrapper 108 so that the bloom portion 102 of the floral grouping 100 is visible via the open upper end 110 of the decorative wrapper 108. In some instances, the bloom portion 102 of the floral grouping 100 may extend beyond the open upper end 110 of the decorative wrapper 108. In some applications, the upper end 110 of the decorative wrapper 108 may be closed if desired. In some applications, the lower end 112 of the decorative wrapper 108 may be closed if desired.

The sheet of material 12c of the optical effect material 10c may also be wrapped about the floral grouping 100 to form a cylindrically shaped decorative cover or wrapper 114 as shown in FIG. 18 or any other shape decorative wrapper if desired in a particular application. U.S. Pat. No. 5,181,364, entitled "Wrapping A Floral Grouping With Sheets Having An Adhesive Or Cohesive Material Applied Thereto", issued to Weder et al. on Jan. 26, 1993, which has been incorporated by reference herein above, discloses methods of wrapping a floral grouping in a cylindrically-shaped wrapper.

Embodiments of FIGS. 19–26

As noted above, the optical effect material 10c may also be used to provide a decorative cover 120 (FIG. 21) for an object or item, such as a flower pot 122 or a potted plant. The term "flower pot" refers to any type of container used for holding a floral grouping or a potted plant. Examples of flower pots are clay pots, plastic pots, wooden pots, pots made from natural and/or synthetic fiber, and the like.

The flower pot 122 has an open upper end 124, a closed lower end 126, and an outer peripheral surface 128. An opening 130 intersects the open upper end 124 of the flower pot 122 so as to form an inner peripheral surface 132 and a retaining space 134.

To form the optical effect material 10c into the decorative cover 120 about the outer peripheral surface 128 of the flower pot 122, both the flower pot 122 and the optical effect material 10c are provided. The sheet of material 12c of the optical effect material 10c is desirably formed of a shape-sustaining material. The flower pot 122 is disposed upon the upper surface 16c of the sheet of material 12c so that the closed lower end 126 of the flower pot 122 is disposed substantially adjacent a portion of the upper surface 16c of the sheet of material 12c.

In one embodiment of a manual application of wrapping the sheet of material 12c about the flower pot 122 to provide the decorative cover 120 for the flower pot 122 wherein the open upper end 124 of the flower pot 122 remains substantially uncovered by the decorative cover 120, the sheet of material 12c is wrapped about the outer peripheral surface 128 of the flower pot 122 so that the upper surface 16c of the sheet of material 12c is disposed substantially adjacent the outer peripheral surface 128 of the flower pot 122 (FIGS. 20 and 21) to form the decorative cover 120 about the flower pot 122 wherein the holographic design 70 of the optical effect material 10c is visible and thereby provides the desired optical effect to the decorative cover 120 (FIG.21). That is, the lower surface 18c of the sheet of material 12c becomes an outer surface 136 of the decorative cover 120 and at least a portion of the holographic design 70 constitutes at least a portion of the decor of the decorative cover.

An adhesive, such as a pressure sensitive adhesive 30c may be disposed on the upper surface 16c of the sheet of material 12c to secure the decorative cover 120 about the outer peripheral surface 128 of the flower pot 122 substantially as shown in FIG. 21. In such instance, a portion of the folds formed in the decorative cover 120 may be connected via the pressure sensitive adhesive 30c and a portion of the folds may remain unconnected.

Figure 22:
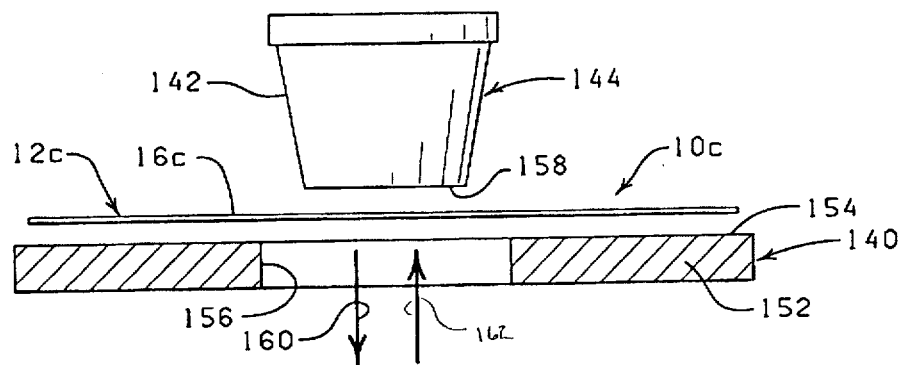
FIG. 22 is a side elevational view, partially in cross-section, of a cover forming apparatus for forming a decorative cover about a flower pot from an optical effect material.

Referring now to FIG. 22, a cover forming apparatus 140 is illustrated for forming an optical effect material, such as the sheet of material 12c of the optical effect material 10c, about an outer peripheral surface 142 of a flower pot 144 to produce a decorative cover 146 having a plurality of dead folds 148. The term "dead folds" as used herein is understood to mean the formation of pleats wherein the pleats are unsecured, i.e., to bondingly connected, but maintain their pleated configuration, such as when one folds metal foil.

One method for forming the sheet of material 12c about the outer peripheral surface 142 of the flower pot 144 by the cover forming apparatus 140 so that an open upper end 150 of the flower pot 144 remains substantially uncovered by the decorative cover 146 is described in U.S. Pat. No. 4,733,521 entitled "Cover Forming Apparatus" issued to Weder et al., on Mar. 29, 1988, which is hereby expressly incorporated herein by reference. The decorative cover 146 formed from the sheet of material 12c may be secured to the outer peripheral surface 142 of the flower pot 144 by the use of one or more bonding materials described herein. One particular method of securing the decorative cover 146 to the flower pot 144 is by applying a band (not shown) about the decorative cover 146 to hold the decorative cover 146 in place about the flower pot 144.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

U.S. Pat. No. 5,105,599, entitled "MEANS FOR SECURING A DECORATIVE COVER ABOUT A FLOWER POT" issued to Weder on Apr. 21, 1992, and which is hereby expressly incorporated herein by reference, discloses methods for securing a decorative cover about a flower pot with a band.

The cover forming apparatus 140 comprises a platform 152 having an upper support surface 154 and a flower pot opening 156 which is formed therethrough and intersects the upper support surface 154. A generally circular shaped applicator (not shown) may be supported on the platform 152 of the cover forming apparatus 140 so as to prevent damage to the sheet of material 12c and the flower pot 144 during formation of the sheet of material 12c into the decorative cover 146. A cover forming apparatus which is constructed and operates similar to the cover forming apparatus 140 is described in detail in U.S. Pat. No. 4,733,521, entitled "COVER FORMING APPARATUS" issued to Weder et al. on Mar. 29, 1988, which is hereby expressly incorporated herein by reference.

The sheet of material 12c of the optical effect material 10c is desirably a shape-sustaining material such as foil, or a combination of a shape-sustaining material and a non-shape sustaining material such as cellophane, or a synthetic polymeric film such as, for example, polypropylene film.

Figure 23:
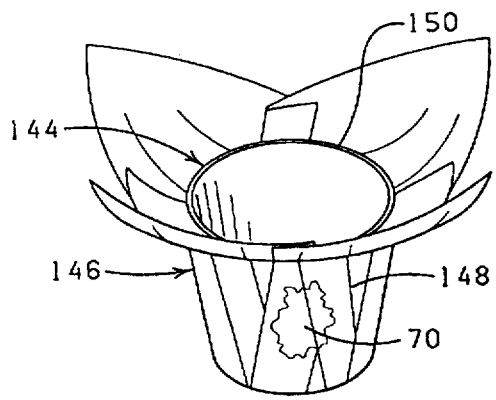
FIG. 23 is a perspective view of the decorative cover formed from an optical effect material using the cover forming apparatus of FIG. 22.

To form the optical effect material 10c into the decorative cover 146 which extends about the outer peripheral surface 142 of the flower pot 144, the sheet of material 12c is placed on the upper support surface 154 of the platform 152 and positioned so that the sheet of material 12c generally is centered over the flower pot opening 156 in the platform 152. The flower pot 144 is then positioned generally above the flower pot opening 156 and the upper surface 16c of the sheet of material 12c. The flower pot 144 is then moved in a downward direction 160 to a position wherein a lower end 158 of the flower pot 144 engages the sheet of material 12c. The flower pot 144 then further is moved in the downward direction 160 thereby pushing the flower pot 144 along with a portion of the sheet of material 12c generally in the downward direction 160 so as to form the sheet of material 12c about the outer peripheral surface 142 of the flower pot 144 such that, upon removal of the flower pot 144 from the flower pot opening 156 in the platform 152 of the cover forming device 140 by movement of the flower pot 144 and the decorative cover 146 disposed about the flower pot 144 in an upward direction 162, the flower pot 144 is provided with the decorative cover 146 having a plurality of dead folds 148 disposed about the outer peripheral surface 142 of the flower pot 144 substantially as shown in FIG. 23, and wherein the holographic design 70 constitutes at least a portion of the decor of the decorative cover 146.

If desired, the decorative cover 146 formed from the sheet of material 12c of the optical effect material 10c may be secured about the outer peripheral surface 142 of the flower pot 144 by the use of one or more bonding materials described herein. One particular method for securing the decorative cover 146 to the flower pot 144 so that the open upper end 150 of the flower pot 144 remains substantially uncovered by the decorative cover 146 is by applying a band (not shown) about the decorative cover 146 to hold the decorative cover 146 in place about the outer peripheral surface 142 of the flower pot 144.

Figure 24:
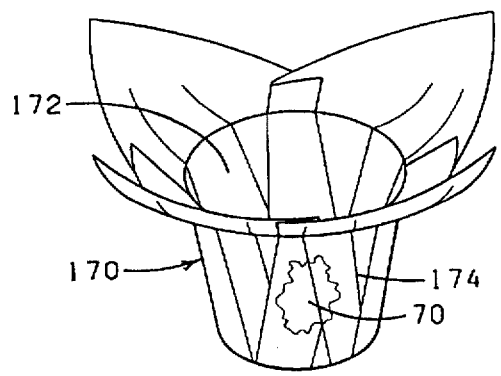
FIG. 24 is a perspective view of a pre-formed decorative pot cover formed from an optical effect material.

Alternatively, the sheet of material 12c may be preformed into a decorative cover 170 having an opening 172 as shown in FIG. 24. The decorative cover 170 is self-supporting by virtue of overlapping folds 174 wherein at least a portion of the overlapping folds 174 are bonded together, thereby forming a substantially rigid structure.

Figure 25:
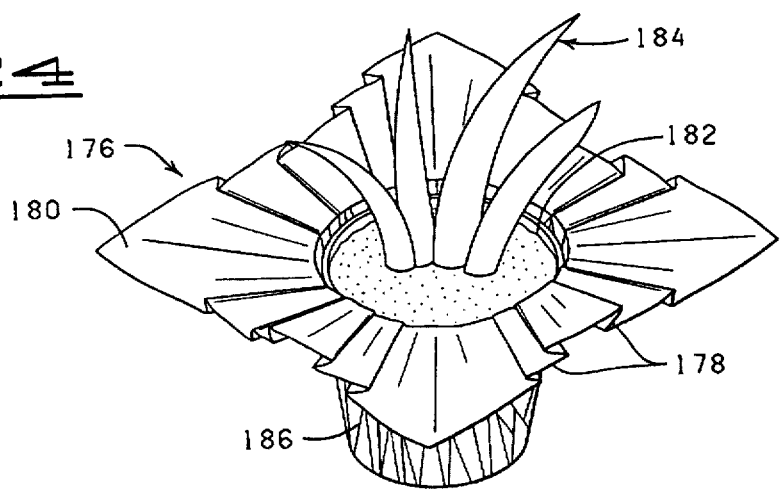
FIG. 25 is a perspective view of a second embodiment of a pre-formed decorative pot cover formed from an optical effect material wherein the pre-formed pot cover has a potted plant therein.

Shown in FIG. 25 is another embodiment of a pre-formed decorative cover 176 formed from the sheet of material 12c of the optical effect material 10c. The decorative cover 176 is provided with a plurality of dead folds 178 formed in at least an upper or skirt portion 180 thereof. The decorative cover 176 has an opening 182 for receiving a potted plant 184 substantially as shown in FIG. 25. The decorative cover 176 is self-supporting by virtue of overlapping folds 186 wherein at least a portion of the overlapping folds 186 are bonded together, thereby forming a substantially rigid structure. A potted plant can be disposed into the decorative cover 176.

One method for forming such a preformed plant cover or pot cover such as the decorative cover 170 and 176 is shown in U. S. Pat. No. 4,773,182 entitled "Article Forming System" issued to Weder et al., on Sep. 27, 1988, which is hereby expressly incorporated herein by reference.

Shown in FIG. 26 is a decorative cover 188 formed from the optical effect material 10d hereinbefore described with reference to FIG. 7 wherein the decorative cover 188 is provided with a plurality of overlapping folds 190 and a plurality of deadfolds 192 formed in at least an upper or skirt portion 194 of the decorative cover 188. At least a portion of the overlapping folds 190 are bonded together, thereby forming a rigid structure. The decorative cover 188 is formed about a flower pot, such as the flower pot 144 (FIG. 22)and the holographic design 70 provides at least a portion of the decor of the decorative cover 188.

Referring now to FIG. 22, in combination with FIG. 26, one method of forming the decorative cover 188 utilizing a cover forming apparatus, such as the cover forming apparatus 140 (FIG. 22) will now be described. To form the optical effect material 10d into the decorative cover 188, the first sheet of material 10d having the holographic design 70 on at least the lower surface 18d thereof and the second sheet of material 14d are placed on the upper support surface 154 of the platform 152 of the cover forming apparatus 114 and positioned thereon so that the first sheet of material 10d and the second sheet of material 14d generally are centered over the flower pot opening 156 in the platform 152. The flower pot 144 is then positioned generally above the flower pot opening 156 and the upper surface 32d of the second sheet of material 14d (the second sheet of material 14d being positioned over the first sheet of material 12d substantially as shown). The flower pot 144 is then moved in the downward direction 160 to a position wherein the lower end 158 of the flower pot 144 engages the second sheet of material 14d and, thus, the first sheet of material 12d of the optical effect material 10d. The flower pot 144 is then further moved in the downward direction 160 so as to form the first and second sheets 12d and 14d of the optical effect material 10d about the outer peripheral surface 142 of the flower pot 144 such that, upon removal of the flower pot 144 from the flower pot opening 156 in the platform 152 of the cover forming device 140, the flower pot 144 is provided with the decorative covering 188 having a plurality of deadfolds 192 and a plurality of overlapping folds 190 wherein at least a portion of the overlapping folds 190 are bonded together to enhance providing the decorative cover 188 with a substantially rigid structure.

The holographic design 70, which is provided on the lower surface 18d of the first sheet of material 12d of the optical effect material 10d provides the decorative cover 18B with a desired visible optical effect. It should be understood that, in addition to the holographic design 70, at least the lower surface 18d of the first sheet of material 12d of the optical effect material 10d may contain printing and/or embossing, which may be in and out of register with one another and/or with the holographic design 70.

The Embodiments of FIG. 27–33

Shown in FIGS. 27 and 28, and designated therein by the general reference numeral 210, is a decorative cover or wrapper for a floral grouping constructed from an optical effect material, such as the optical effect material 10c herein before described with reference to FIG. 6. The wrapper 210 comprises a sleeve 212 which is generally tubular in shape. The sleeve 212 has a first end 214, a second end 216, an outer peripheral surface 218 and an opening 220 intersecting both the first end 214 and the second end 216, forming an inner peripheral surface 222 and providing a retaining space 223 therein. The holographic design 70 of the optical effect material 10c is visible on the outer peripheral surface 218 of the sleeve 212. A floral grouping 224 (FIG. 28) may be disposed in the retaining space 223 in the sleeve 212 as will be described in more detail hereinafter. It should be noted that the second end 216 may be closed, forming a closed end (not shown), in which case the opening 220 only intersects the first end 214 of the sleeve 212. Sleeves, and their construction, are well known in the art and sleeves are commercially available, as are various devices and mechanisms capable of forming sleeves.

A bonding material (not shown herein but is shown in U.S. Ser. No. 08/218,952, which is specifically incorporated herein by reference) may be disposed on at least a portion of the inner peripheral surface 222 of the sleeve 212, or, alternatively, a bonding material 226 (FIG. 30) may be disposed on the outer peripheral surface 218 of the sleeve 212, or, in a further alternative, the bonding material may be disposed on both the inner peripheral surface 222 and the outer peripheral surface 218 of the sleeve 212. The bonding material may further comprise a color, or a combination of colors, as previously described herein. Further, the bonding material may comprise at least a portion of a design on the sleeve 212.

The sleeve 212 is generally tubularly shaped, but the shape of the sleeve 212 may be, by way of example but not by way of limitation, cylindrical, conical, frusto-conical, or a combination of both frusto-conical and cylindrical. Further, as long as the sleeve 212 is capable of receiving the floral grouping 224, any shape of sleeve 212, whether geometric, non-geometric, asymmetrical and/or fanciful, may be utilized.

In a general method of use, illustrated in FIGS. 28–30, at least a portion of the floral grouping 224 is disposed within the sleeve 212. In some applications, a stem portion 228 of the floral grouping 224 extends into the sleeve 212 via the open first end 214, extending through the open second end 216 of the sleeve 212 and beyond the open second end 216. A bloom portion 230 of the floral grouping 224 is therefore disposed near the open first end 214 of the sleeve 212 and the bloom portion 230 of the floral grouping 224 is visible via the open first end 214 of the sleeve. In some instances, the bloom portion 230 of the floral grouping 224 may extend above the open first end 214 of the sleeve 212. In some applications, the first end 214 of the sleeve 212 may be closed if desired. In some circumstances, the second end 216 of the sleeve 212 may be closed if desired.

In one method of use, an operator provides the sleeve 212 and the floral grouping 224. The operator then disposes the floral grouping 224 into the sleeve 212 by opening the sleeve 212 at the first end 214 whereby the retaining space 223 is expanded so as to receive the floral grouping 224, as shown in FIG. 27. The operator then disposes the floral grouping 224 into the opening 220 in the sleeve 212 and the retaining space 223 by inserting first the stem portion 228 of the floral grouping 224 into the retaining space 223 of the sleeve 212 via the opening in the first end 214, in a manner which permits a portion of the stem portion 228 to be disposed in the retaining space 223 adjacent the second end 216 of the sleeve 212, the second end 216 generally having the narrowest diameter. In inserting the floral grouping 224 into the sleeve 212 in this manner, the bloom portion 230 of the floral grouping 224 is also disposed in the retaining space 223 of the sleeve 212 and the bloom portion 230 is disposed substantially adjacent the first end 214 of the sleeve 212, the first end 214 having generally having the widest diameter. In this method, at least a portion of the stem portion 228 of the floral grouping 224 extends slightly beyond the second end 216 of the sleeve 212, and the bloom portion 230 of the floral grouping 224 is clearly visible at the open first end 214 of the sleeve 212 FIG. 28).

The sleeve 212 may then be crimped about the floral grouping 224, as shown in FIGS. 29 and 30. The crimping operation is conducted by an operator after the floral grouping 224 is disposed in the sleeve 212 by crimping at least a portion of the sleeve 212 in the area of the stem portion 228 of the floral grouping 224, at least a portion of the bonding material 226 being disposed on this area (or on the inner peripheral surface as discussed above) to retain the crimped sleeve 212 in the crimped condition. Such crimping may be conducted by hand, by grasping and substantially encompassing with one or more hands the second end 216 of the sleeve 212 in the area of the bonding material 226 and evenly and firmly squeezing that portion of the sleeve 212 about the area having the bonding material 226, thereby pressing and gathering both the sleeve 212 and the bonding material 226 against itself and about the stem portion 228 of the floral grouping 224. The sleeve 212 may also be crimped by using both a crimping motion (as described above) and a turning motion to create a twisted crimping, resulting in a sleeve 212 which is both crimped as previously described, and which is twisted about at least a portion of the stem portion 228 of the floral grouping 224, the sleeve 212 near the stem portion 228 being rotated for example, but not by way of limitation, about the stem portion 228 between about one-eighth of a turn to about a full turn (not shown).

When the sleeve 212 is crimped, a plurality of overlapping folds 240 are formed in the crimped area. The plurality of overlapping folds 240 (only one overlapping fold being designated by the numeral 240 in FIGS. 29 and 30) resulting from the gathered, crimped material of the sleeve 212 may be connected, that is, all portions of the overlapping optical effect material 10c of the sleeve 212 are bondingly connected together via bonding material 226. A plurality of the overlapping folds 240 may be formed by hand, during crimping, or by mechanical means. Such mechanical means are disclosed generally in "Article Forming System," which has been previously incorporated by reference herein. Alternatively, the crimping may be conducted in a manner in which not all of the plurality of overlapping folds 240 are bondingly connected together. It will be appreciated that the plurality of overlapping folds 240 (connected or unconnected) are formed primarily in the crimped area. Such crimping as described above may also be conducted by any device or mechanism known in the art and used for gathering or crimping materials.

Alternatively, the sleeve 212 may remain uncrimped. The bonding material (not shown) disposed upon the sleeve 212 may cause the sleeve 212 to bondingly connect to portions of itself, causing the sleeve 212 to conform, either generally, or closely (depending, as will be appreciated, upon the amount of bonding material and the amount of the optical effect material 10c of the sleeve 212 which overlaps and connects to itself) to the floral grouping 224.

When the floral grouping 224 is disposed in the sleeve 212 by any method described herein, or known in the art, the sleeve 212 substantially surrounds and encompasses a substantial portion of the floral grouping 224. When the sleeve 212 is disposed about the floral grouping 224, the sleeve 212 forms the wrapper 210 having the holographic design 70 which is visible and thereby constitutes at least a portion of the decor for a (the?) decorative packaging or cover for the floral grouping 224 contained therein.

It will be appreciated that the sleeve 212 has sufficient flexibility but also sufficient rigidity to both remain in and sustain its general shape, thereby substantially surrounding and encompassing the floral grouping 224.

Shown in FIGS. 31–33 is a decorative cover or wrapper 210a for a flower pot 250 which is constructed from the optical effect material 10c. The wrapper 210a is substantially identical in construction to the wrapper 210 with the exceptions hereinafter described. The wrapper 210a comprises a sleeve 212a which extends over an outer peripheral surface 252 of the flower pot 250. The sleeve 212a, having the holographic design 70 of the optical effect material 10c visible thereon, may comprise at least a portion of a flower pot cover having the holographic design 70 visible thereon and an upper portion 254 having the holographic design 70 visible thereon. The upper portion 254 of the sleeve 212a is detachable from a lower portion 256 of the sleeve 212a via vertical perforations 258 and/or circumferential perforations 260 extending about the sleeve 212a near or above the level of a open upper end 262 of the flower pot 250 (FIG. 33); or, alternatively, the sleeve 212a may extend over the flower pot 250 which is already covered by a decorative cover (not shown). In either event, the sleeve 212a is often detached after shipment and delivery. The sleeve 212a usually has a bonding material (not shown herein but is shown in U.S. patent application Ser. No. 08/220,852, which is specifically incorporated herein by reference) disposed thereupon such that a second end 216a of the sleeve 212a will connect to the flower pot 250. Alternatively, a bonding material (not shown) may be disposed upon the outer peripheral surface 252 of the flower pot 250. In a further alternative, the bonding material (not shown) may be disposed on both the flower pot 250 and the sleeve 212a. The flower pot 250 may contain a floral grouping 264 disposed therein.

It will be appreciated that the method of disposing a flower pot 250 into the sleeve 212a is generally substantially similar to the method described above for disposing the floral grouping 224 into the sleeve 212.

The Embodiment of FIG. 34

Shown in FIG. 34 and designated therein by the general reference numeral 270 is a decorative cover or wrapper for a floral grouping 272 constructed from the optical effect material 10c, as shown in FIG. 6 and described in detail herein previously. The wrapper 270 is identical to the sleeve 212 above, except that the wrapper 270 is a narrow tubular shape which is constructed to accommodate a floral grouping 272 comprising generally only a single bloom portion 274 and stem portion 276. The method of use of the wrapper 270 is identical to the method of use shown in FIGS. 27–30 and described in detail herein above.

Changes may be made in the construction and the operation of the various components, elements and assemblies described herein or in the steps or the sequence of steps of the methods described herein without departing from the spirit and scope of the invention as defined in the following claims.

What is claimed:

1. A method for forming a decorative cover about a FLOWER POT, the method comprising:

providing an optical effect material comprising a sheet of material having an upper surface, a lower surface and a holographic design on at least a portion of the lower surface; and wrapping the sheet of material about the outer peripheral surface of the flower pot while leaving the opening of the flower pot substantially uncovered to provide the decorative cover for the flower pot wherein the decorative cover is provided with a plurality of overlapping folds and wherein at least a portion of the holographic design of the optical effect material is visible and constitutes at least a portion of the decor of the decorative cover.

2. The method for forming a decorative cover about a flower pot of claim 1 wherein, in the step of providing the optical effect material, the sheet of material is further provided with an embossed pattern thereon which cooperates with the holographic design to provide the decor of the decorative cover formed about the flower pot from the optical effect material.

3. The method for forming a decorative cover about a flower pot of claim 1 wherein, in the step of providing the optical effect material, the sheet of material is provided with an adhesive on at least a portion of at least one of the upper and lower surfaces thereof such that upon wrapping the sheet of material about the outer peripheral surface of the flower pot, at least a portion of the overlapping folds are bonded.

4. The method for forming a decorative cover about a flower pot of claim 1 wherein, in the step of providing the optical effect material, the sheet of material is further provided with printed matter thereon which cooperates with the holographic design to provide the decor of the decorative cover formed about the flower pot from the optical effect material.

5. The method for forming a decorative cover about a flower pot of claim 4 wherein, in the step of providing the optical effect material, the sheet of material is further provided with an embossed pattern thereon which cooperates with the holographic design and the printed matter to provide the decor of the decorative cover formed about the flower pot from the optical effect material.

6. The method for forming a decorative cover about a flower pot of claim 5 wherein, in the step of providing the optical effect material, at least a portion of the printed matter and the embossed pattern on the sheet of material are in registry.

7. A method for forming a decorative cover about an outer peripheral surface of a flower pot utilizing a cover forming device comprising a platform having a support surface and a flower pot opening which is formed therethrough and which intersects the support surface, comprising:

providing the flower pot having an outer peripheral surface and an upper opening;

providing an optical effect material comprising a sheet of material having an upper surface, a lower surface and a holographic design on at least a portion of at least one of the upper surface and the lower surface;

disposing the sheet of material upon the support surface of the platform of the cover forming device and over the flower pot opening therein;

placing the flower pot over the flower pot opening in the cover forming device;

moving the flower pot into engagement with the sheet of material and through the flower pot opening in the cover forming device for forming the sheet of material generally about the outer peripheral surface of the flower pot while leaving the opening of the flower pot uncovered to provide a decorative cover for the flower pot having overlapping folds wherein at least a portion of the holographic design is visible and constitutes at least a portion of the decor of the decorative cover; and removing the flower pot with the decorative cover formed about the outer peripheral surface of the flower pot from the flower pot opening in the cover forming device.

8. The method for forming a decorative cover about an outer peripheral surface of a flower pot of claim 7 wherein, in the step of providing the optical effect material, the sheet of material is further provided with an adhesive on at least a portion of the upper surface thereof such that upon forming the sheet of material generally about the outer peripheral surface of the flower pot at least a portion of the overlapping folds are bonded by contacting the adhesive on the upper surface of the sheet of material with adjacent overlapping portion of the upper surface of the sheet of material.

9. The method for forming a decorative cover about an outer peripheral surface of a flower pot of claim 8 wherein, in the step of providing the optical effect material, the sheet of material is further provided with printed matter thereon which cooperates with the holographic design to provide the decor of the decorative cover formed about the outer peripheral surface of the flower pot.

10. The method for forming a decorative cover about an outer peripheral surface of a flower pot of claim 9 wherein, in the step of providing the optical effect material, the sheet of material is further provided with an embossed pattern thereon which cooperates with the holographic design and the printed matter to provide the decor of the decorative cover formed about the outer peripheral surface of the flower pot.

11. The method for forming a decorative cover about an outer peripheral surface of a flower pot of claim 10 wherein, in the step of providing the optical effect material, at least a portion of the printed matter and the embossed pattern on the sheet of material are in registry.

12. The method for forming a decorative cover about an outer peripheral surface of a flower pot of claim 8 wherein, in the step of providing the optical effect material, the sheet of material is further provided with an embossed pattern thereon which cooperates with the holographic design to provide the decor of the decorative cover formed about the outer peripheral surface of the flower pot.

13. The method for forming a decorative cover about an outer peripheral surface of a flower pot of claim 7 wherein, in the step of providing the optical effect material, the sheet of material is further provided with an adhesive on the upper surface thereof such that upon forming the sheet of material generally about the outer peripheral surface of the flower pot the overlapping folds are bonded by contacting the adhesive on the upper surface of the sheet of material with adjacent overlapping portion of the upper surface of the sheet of material and the decorative cover formed about the outer peripheral surface of the flower pot is bonded to the flower by contacting at least a portion of the adhesive on the upper surface of the sheet of material with the outer peripheral surface of the flower pot.

14. The method for forming a decorative cover about an outer peripheral surface of a flower pot of claim 13 wherein, in the step of providing the optical effect material, the sheet of material is further provided with printed matter thereon which cooperates with the holographic design to provide the decor of the decorative cover formed about the outer peripheral surface of the flower pot.

15. The method for forming a decorative cover about an outer peripheral surface of a flower pot of claim 14 wherein, in the step of providing the optical effect material, the sheet of material is further provided with an embossed pattern thereon which cooperates with the holographic design and the printed matter to provide the decor of the decorative cover formed about the outer peripheral surface of the flower pot.

16. The method for forming a decorative cover about an outer peripheral surface of a flower pot of claim 15 wherein, in the step of providing the optical effect material, at least a portion of the printed matter and the embossed pattern on the sheet of material are in registry.

17. The method for forming a decorative cover about an outer peripheral surface of a flower pot of claim 13 wherein, in the step of providing the optical effect material, the sheet of material is further provided with an embossed pattern thereon which cooperates with the holographic design to provide the decor of the decorative cover formed about the outer peripheral surface of the flower pot.

18. A method for forming a decorative cover about a flower pot having an outer peripheral surface and an upper opening, the method comprising:

providing an optical effect material comprising a sheet of material having an upper surface, a lower surface and a holographic design on at least the lower surface thereof;

providing a sheet of foil;

positioning the sheet of foil adjacent the upper surface of the sheet of material;

wrapping the sheet of material and the sheet of foil generally about the outer peripheral surface of the flower pot while leaving the opening of the flower pot uncovered to provide a decorative cover for the flower pot wherein the decorative cover is provided with a plurality of dead folds and wherein at least a portion of the holographic design is visible and constitutes at least a portion of the decor of the decorative cover.

19. The method for forming a decorative cover about an outer peripheral surface of a flower pot of claim 18 wherein, in the step of providing the optical effect material, the sheet of material is further provided with an adhesive on at least a portion of the upper surface thereof such that the sheet of foil is bonded to the sheet of material of the optical effect material when the sheet of foil is positioned adjacent the upper surface of the sheet of material.

20. The method for forming a decorative cover about an outer peripheral surface of a flower pot of claim 19 wherein, in the step of providing the optical effect material, the sheet of material is further provided with printed matter on at least a portion thereof which cooperates with the holographic design of the optical effect material and the sheet of foil to provide the decor of the decorative cover formed about the outer peripheral surface of the flower pot.

21. The method for forming a decorative cover about an outer peripheral surface of a flower pot of claim 20 wherein, in the step of providing the optical effect material, the sheet of material is further provided with an embossed pattern thereon which cooperates with the holographic design and the printed matter of the optical effect material and the sheet of foil to provide the decor of the decorative cover formed about the outer peripheral surface of the flower pot.

22. The method for forming a decorative cover about an outer peripheral surface of a flower pot of claim 21 wherein, in the step of providing the optical effect material, at least a portion of the printed matter and the embossed pattern on the sheet of material are in registry.

23. The method for forming a decorative cover about an outer peripheral surface of a flower pot of claim 19 wherein, in the step of providing the optical effect material, the sheet of material is further provided with an embossed pattern thereon which cooperates with the holographic design of the optical effect material and the sheet of foil to provide the decor of the decorative cover formed about the outer peripheral surface of the flower pot.

24. The method for forming a decorative cover about an outer peripheral surface of a flower pot of claim 18 wherein, in the step of providing the optical effect material, the sheet of material is further provided with printed matter on at least a portion thereof which cooperates with the holographic design of the optical effect material and the sheet of foil to provide the decor of the decorative cover formed about the outer peripheral surface of the flower pot.

25. The method for forming a decorative cover about an outer peripheral surface of a flower pot of claim 24 wherein, in the step of providing the optical effect material, the sheet of material is further provided with an embossed pattern thereon which cooperates with the holographic design and the printed matter of the optical effect material and the sheet of foil to provide the decor of the decorative cover formed about the outer peripheral surface of the flower pot.

26. The method for forming a decorative cover about an outer peripheral surface of a flower pot of claim 25 wherein, in the step of providing the optical effect material, at least a portion of the printed matter and the embossed pattern on the sheet of material are in registry.

27. The method for forming a decorative cover about an outer peripheral surface of a flower pot of claim 18 wherein, in the step of providing the optical effect material, the sheet of material is further provided with an embossed pattern thereon which cooperates with the holographic design of the optical effect material and the sheet of foil to provide the decor of the decorative cover formed about the outer peripheral surface of the flower pot.

28. The method for forming a decorative cover about an outer peripheral surface of a flower pot of claim 18 further comprising:

laminating the optical effect material and the sheet of foil prior to wrapping same generally about the outer peripheral surface of the flower pot.

29. The method for forming a decorative cover about an outer peripheral surface of a flower pot of claim 28 wherein, in the step of providing the optical effect material, the sheet of material is further provided with printed matter thereon which cooperates with the holographic design of the optical effect material and the sheet of foil to provide the decor of the decorative cover formed about the outer peripheral surface of the flower pot.

30. The method for forming a decorative cover about an outer peripheral surface of a flower pot of claim 29 wherein, in the step of providing the optical effect material, the sheet of material is further provided with an embossed pattern thereon which cooperates with the holographic design and the printed matter of the optical effect material and with the sheet of foil to provide the decor of the decorative cover formed about the outer peripheral surface of the flower pot.

31. The method for forming a decorative cover about an outer peripheral surface of a flower pot of claim 30 wherein, in the step of providing the optical effect material, at least a portion of the printed matter and the embossed pattern on the sheet of material are in registry.

32. The method for forming a decorative cover about an outer peripheral surface of a flower pot of claim 28 wherein, in the step of providing the optical effect material, the sheet of material is further provided with an embossed pattern thereon which cooperates with the holographic design of the optical effect material and with the sheet of foil to provide the decor of the decorative cover formed about the outer peripheral surface of the flower pot.

33. A method utilizing a cover forming device comprising a platform having a support surface and a flower pot opening which is formed therethrough which intersects the support surface, comprising:

providing a flower pot having an outer peripheral surface and an upper opening;

providing a sheet of material having an upper surface, a lower surface and a holographic design;

providing a sheet of foil;

positioning the sheet of foil adjacent the upper surface of the sheet of material having the holographic design;

disposing the sheet of material having the holographic design via the lower surface thereof upon the support surface of the platform of the cover forming device and over the flower pot opening therein;

placing the flower pot over the flower pot opening in the cover forming device;

moving the flower pot downward into engagement with the sheet of foil and the sheet of material having the holographic design and through the flower pot opening in the cover forming device for forming the sheet of foil and the sheet of material having the holographic design generally about the outer peripheral surface of the flower pot to provide a decorative cover for the flower pot wherein the decorative cover is provided with a plurality of dead folds and wherein the holographic design is visible and constitutes at least a portion of the decor of the decorative cover which extends about at least the outer peripheral surface of the flower pot while leaving the opening of the flower pot uncovered; and removing the flower pot with the decorative cover having dead fold characteristics formed from the sheet of foil and the sheet of material having the holographic design disposed about at least the outer peripheral surface of the flower pot from the flower pot opening in the cover forming device.

34. The method of claim 33 further comprising:

laminating the sheet of material having the holographic design and the sheet of foil prior to disposing same upon the support surface of the platform of the cover forming device and over the flower pot opening therein.

35. A method for providing a decorative covering for a flower pot comprising:

providing an optical effect material comprising a sheet of material having an upper surface, a lower surface, a pressure sensitive adhesive on at least a portion of the upper surface and a holographic design on at least the lower surface thereof;

forming the sheet of material into a decorative cover for a flower pot wherein the decorative cover is provided with a plurality of overlapping folds wherein at least a portion of the overlapping folds are connected to provide structural rigidity to the pot cover and wherein at least a portion of the holographic design is visible and constitutes at least a portion of the decor of the decorative cover, the decorative cover having an object opening formed through an upper end thereof sized to receive a flower pot;

providing the flower pot having an outer peripheral surface; and disposing the flower pot in the object opening of the decorative cover with the decorative cover encompassing a substantial portion of the flower pot.

36. The method for providing a decorative covering for a flower pot of claim 35 wherein, in the step of providing the optical effect material, the sheet of material is further provided with printed matter on at least a portion thereof which cooperates with the holographic design of the optical effect material to provide the decor of the decorative cover.

37. The method for providing a decorative covering for a flower pot of claim 36 wherein, in the step of providing the optical effect material, the sheet of material is further provided with an embossed pattern thereon which cooperates with the holographic design and the printed matter of the optical effect material to provide the decor of the decorative cover.

38. The method for providing a decorative covering for a flower pot of claim 35 wherein, in the step of providing the optical effect material, the sheet of material is further provided with an embossed pattern thereon which cooperates with the holographic design of the optical effect material to provide the decor of the decorative cover.

* * * * *

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

It is certified that error appears in the above-identified patent and that said Letters Patent is hereby corrected as shown below:

Title page,
Item [63], line 19, after "abandoned," and before "said" insert -- which is a continuation of Ser. No. 219,083, Jul. 13, 1998, Pat. No. 4,897,031, which is a continuation of Ser. No. 004,275, Jan. 5, 1987, Pat. No. 4,773,182, which is a continuation of Ser. No. 613,080, May 22, 1984, abandoned, --.
Line 22, after "219,083," and before "said insert -- Jul. 13, 1988, Pat. No. 4,897,031, which is a continuation of Ser. No. 004,275, Jan. 5, 1987, Pat. No. 4,773,182, which is a continuation of Ser. No. 613,080, May 22, 1984, abandoned. --.
Line 27, after "865,563," and before "said", delete "and Ser. No. 893,586," and insert -- April 9, 1992, Pat. No. 5,245,814, which is a continuation of Serial No. 649,379, Jan. 31, 1991, Pat. No. 5,111,638, which is a continuation of Ser. No. 249,761, Sep. 26, 1988, abandoned, said Ser. No. 963,882 is a continuation-in-part of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, --.
Line 31, after "707,417," and before "said" insert -- May 28, 1991, abandoned, which is a continuation of Ser. No. 502,358, Mar. 29, 1990, abandoned, which is a continuation-in-part of Ser. No. 249,761, Sep. 26, 1988, abandoned, --.
Line 35, after "803,318," and before "said" insert -- Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, --.
Line 40, after "219,083," and before "said" insert -- Jul. 13, 1988, Pat. No. 4,897,031, which is a continuation of Ser. No. 004,275, Jan. 5, 1987, Pat. No. 4,773,182, which is a continuation of Ser. No. 613,080, May 22, 1984, abandoned, --.
Line 41, delete "687,701." and substitute therefor -- 687,701, Apr. 18, 1991, abandoned which is a continuation-in-part of 649,263, Jan. 30 1991, abandoned, which is a continuation of Ser. No. 248,960, Sep. 26, 1988, abandoned, which is a continuation-in-part of Ser. No. 219,083, Jul. 13, 1988, Pat. No. 4,897,031, which is a continuation of Ser. No. 004,275, Jan. 5, 1987, Pat. No. 4,773,182, which is a continuation of Ser. No. 613,080, May 22, 1984, abandoned. --.

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

It is certified that error appears in the above-identified patent and that said Letters Patent is hereby corrected as shown below:

Drawings,
FIG. 6, please delete the numeral "70c" and substitute therefor -- 70 --.

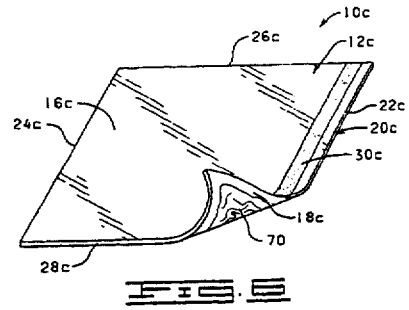

FIG. 7, please delete the numeral "44d" and substitute therefor -- 42d --; please delete the numeral "42d" and substitute therefor -- 44d --; please insert the numeral -- 16d -- and its associated lead line.

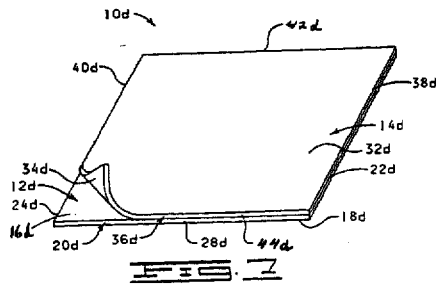

FIG. 20, please insert the numeral -- 16c -- and its associated lead line.

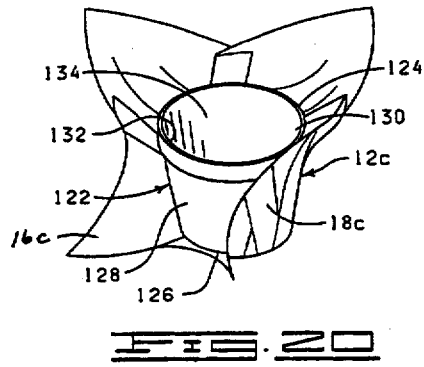

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

It is certified that error appears in the above-identified patent and that said Letters Patent is hereby corrected as shown below:

FIG. 22, please insert the numeral -- 162 -- and its associated lead line.

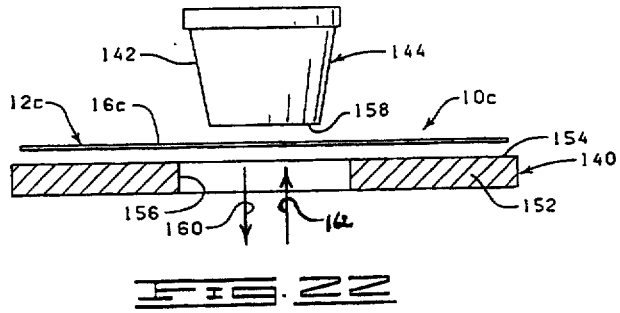

FIG. 26, please insert the numerals -- 190 --, -- 192 --, and -- 194 -- and each associated lead line.

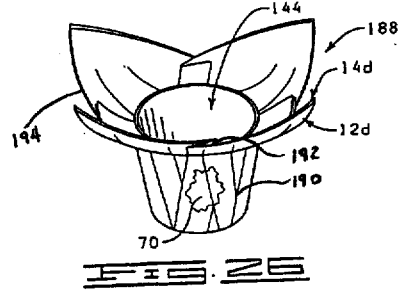

FIG. 30, please insert the numeral -- 220 -- and its associated lead line.

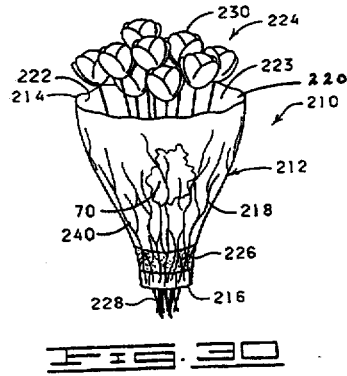

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

Page 4 of 7

It is certified that error appears in the above-identified patent and that said Letters Patent is hereby corrected as shown below:

FIG. 31, please insert the numeral -- 212a -- and its associated lead line.

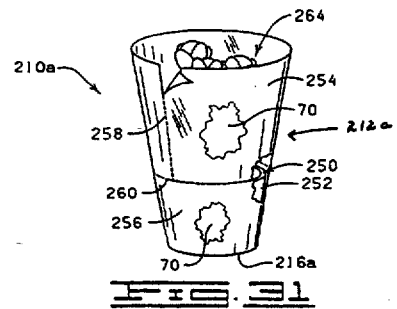

FIG. 32, please insert the numeral -- 212a -- and its associated lead line.

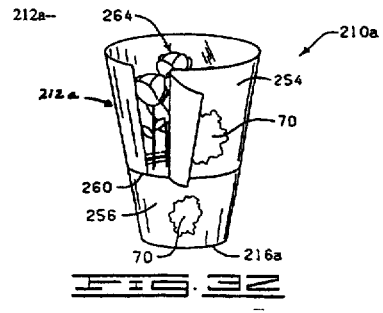

FIG. 33, please insert the numerals -- 212a -- and -- 256 -- and each associated lead line.

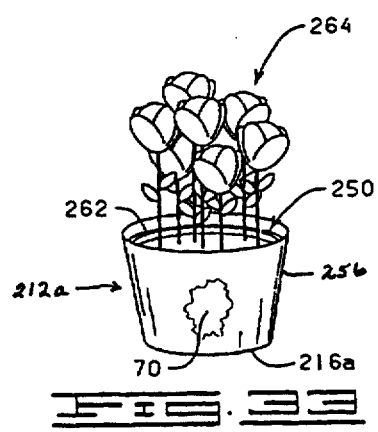

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

It is certified that error appears in the above-identified patent and that said Letters Patent is hereby corrected as shown below:

Column 1,
Line 54, delete "RAVING" and substitute -- HAVING -- therefor;

Column 4,
Line 20, after "is" and before "top" insert -- a --;
Line 37-38, delete "having a holographic design of FIG. 6";

Column 6,
Line 43, delete "herein is to" and substitute therefor -- herein to --;

Column 8,
Line 5, delete "to about 0.1 mils." and substitute therefor -- to about 10 mils. --;

Column 9,
Line 1, delete "iridescent" and substitute -- Iridescent -- therefor;

Column 10,
Line 13, delete "is" and substitute -- are -- therefor;

Column 11,
Line 21, delete "of" and substitute -- or -- therefor;
Line 22, delete "effect" and substitute -- effects -- therefor;
Line 31, delete "which" and substitute -- and -- therefor;
Line 53, delete "first sheet 14a" and substitute therefor -- first sheet of material 12a --;
Line 55, delete "reflect" and substitute -- reflected -- therefor;
Line 65, delete "14a" and substitute -- 12a -- therefor ;

Column 12,
Line 55, delete "tinted of" and substitute -- tinted or -- therefor;
Line 56, delete "effect" and substitute -- effects -- therefor;

Column 13,
Line 5, delete "materials 10b" and substitute -- material 10b -- therefor;
Line 15, delete "reflect" and substitute -- reflected -- therefor;
Line 35, delete "54b" and substitute -- 54 -- therefor;
Line 59, delete "has an" (first occurrence);

Column 14,
Line 67, delete "space" and substitute -- spaced -- therefor;

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

Figure 16:
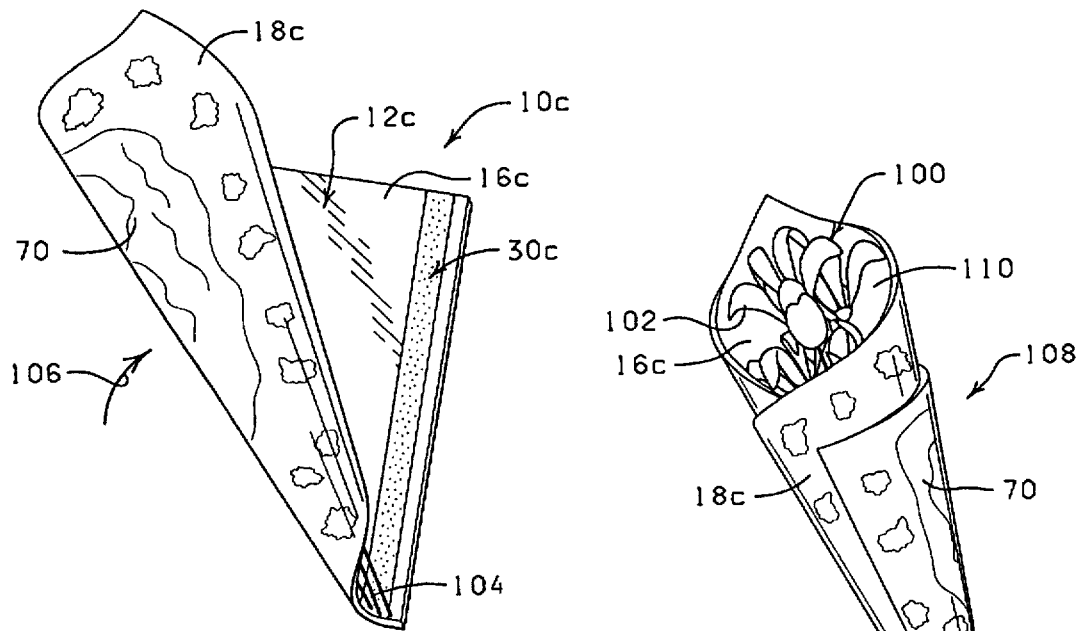
FIG. 16 is a perspective view of the floral grouping of FIG. 15 being wrapped in one method of wrapping with the sheet of optical effect material.

It is certified that error appears in the above-identified patent and that said Letters Patent is hereby corrected as shown below:

Column 15,
Line 3, delete "for" and substitute -- or -- therefor;
Line 18, delete "design 70*d*" and substitute -- design 70 (not shown) -- therefor;
Line 21, delete "design 70 is" and substitute -- design 70, as --;
Line 21, delete "as being" and substitute -- is -- therefor;
Line 45, delete "70*d*" and substitute -- 70, -- therefor;
Line 46, delete "70*d*" and substitute -- 70 -- therefor;

Column 16,
Line 12, delete "shape" and substitute -- shaped -- therefor;
Line 22, after "material" and before "comprises" insert -- 14*d* --;

Column 18,
Line 25, delete "direction 90" and substitute -- direction 92 -- therefor;
Line 27, delete "re-engages" and substitute -- re-engage -- therefor;
Line 30, delete "98," and substitute therefor -- 98 (FIG. 14), --;
Line 40, delete "72*a*" and substitute -- 72*d* -- therefor;
Line 45, delete "material 10*c*" and substitute therefor -- material 10*d* --;

Column 19,
Line 17, delete "FIGS. 15-17" and substitute -- FIGS. 15-18 -- therefor;
Lines 65-66, delete "In other applications, the stem portion 104 does not extend through the open lower end 112 of the decorative wrapper 108.";

Column 20,
Line 16, delete "shape" and substitute -- shaped -- therefor;

Column 21,
Line 13, delete "to bondingly" and substitute -- not bondingly -- therefor;

Column 22,
Line 61, delete "decorative cover" and substitute therefor -- decorative covers --;

Column 23,
Line 14, delete "material 10*d*" and substitute therefor -- material 12*d* -- therefor;
Line 17, delete "apparatus 114" and substitute therefor -- apparatus 140 --;
Line 18, delete "material 10*d*" and substitute therefor -- material 12*d* --;
Line 44, delete "18B" and substitute therefor -- 188 --;

UNITED STATES PATENT AND TRADEMARK OFFICE
CERTIFICATE OF CORRECTION

PATENT NO. : 5,727,362
DATED : March 17, 1998
INVENTOR(S) : Donald E. Weder

It is certified that error appears in the above-identified patent and that said Letters Patent is hereby corrected as shown below:

Column 24,
Line 60, delete "having" (first occurrence);
Line 65, delete "212 FIG. 28)." and substitute therefor -- 212 (FIG. 28). --;

Column 25,
Line 60, delete "(the?)";

Column 26,
Line 14, delete "of a" and substitute therefor -- of an --;
Line 54, delete "FLOWER POT" and substitute therefor -- flower pot --; and Column 28,
Line 45, before "by" insert -- pot --.

Signed and Sealed this

Fifth Day of February, 2002

*Attest:*

JAMES E. ROGAN
*Attesting Officer*     *Director of the United States Patent and Trademark Office*